United States Patent
Sakurai

(10) Patent No.: US 7,930,759 B2
(45) Date of Patent: Apr. 19, 2011

(54) BACKUP SYSTEM FOR IMAGE FORMING APPARATUS AND BACKUP METHOD FOR IMAGE FORMING APPARATUS

(75) Inventor: Atsushi Sakurai, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 831 days.

(21) Appl. No.: 11/937,047

(22) Filed: Nov. 8, 2007

(65) Prior Publication Data

US 2008/0253573 A1 Oct. 16, 2008

Related U.S. Application Data

(60) Provisional application No. 60/865,056, filed on Nov. 9, 2006.

(51) Int. Cl.
*G06F 7/04* (2006.01)
*G06F 13/00* (2006.01)

(52) U.S. Cl. .......................................... 726/27; 711/162
(58) Field of Classification Search ........................ None
See application file for complete search history.

(56) References Cited

U.S. PATENT DOCUMENTS

| | | | | |
|---|---|---|---|---|
| 6,477,649 B2 * | 11/2002 | Kambayashi et al. | ........... | 726/27 |
| 6,577,735 B1 * | 6/2003 | Bharat | ........................... | 380/286 |
| 7,664,966 B2 * | 2/2010 | Alkove et al. | ................ | 713/193 |
| 2002/0002466 A1 * | 1/2002 | Kambayashi et al. | ............ | 705/1 |
| 2006/0053179 A1 * | 3/2006 | Imaizumi et al. | ............. | 707/204 |
| 2006/0106721 A1 * | 5/2006 | Hori et al. | ........................ | 705/51 |
| 2006/0198517 A1 * | 9/2006 | Cameron et al. | ................ | 380/44 |
| 2007/0014398 A1 * | 1/2007 | Eldridge et al. | ................ | 380/44 |
| 2007/0064935 A1 * | 3/2007 | Ben-Yehuda | .................. | 380/44 |

FOREIGN PATENT DOCUMENTS

JP   2004-171114   6/2004

* cited by examiner

*Primary Examiner* — William R Korzuch
*Assistant Examiner* — Abdullah Almamun
(74) *Attorney, Agent, or Firm* — Turocy & Watson, LLP

(57) ABSTRACT

According to one embodiment, a backup system for an image forming apparatus includes: the image forming apparatus including an original data storage unit configured to store data, the image forming apparatus sending a backup copy of the data; and a backup apparatus electrically communicating with the image forming apparatus, the backup apparatus including a backup copy storage unit configured to save the backup copy received from the image forming apparatus, wherein the image forming apparatus further includes: a key generation unit configured to uniquely generate a key from an input key seed; an encryption and decryption unit configured to execute an encryption process and a decryption process in a symmetric-key cryptosystem using the key generated from the key seed by the key generation unit; and a nonvolatile memory unit configured to pre-store a first key seed, and the backup apparatus further includes: a nonvolatile memory unit configured to pre-store a second key seed.

20 Claims, 19 Drawing Sheets

|  | Copy | | Print | |
|---|---|---|---|---|
|  | B/W | Color | Mono | Color |
| File SAVING | ABSENT | ABSENT | ABSENT | ABSENT |
| FUNCTIONAL RESTRICTION | ABSENT | ABSENT | ABSENT | ABSENT |

|  | PrintToBox | | Scanto*** | | Boxto*** | |
|---|---|---|---|---|---|---|
|  | B/W | Color | B/W | Color | B/W | Color |
| File SAVING | PRESENT | PRESENT | PRESENT | PRESENT | PRESENT | PRESENT |
| FUNCTIONAL RESTRICTION | PRESENT | PRESENT | PRESENT | PRESENT | PRESENT | PRESENT |

|  | FAX | | | |
|---|---|---|---|---|
|  | MEMORY TRANSMISSION | MEMORY RECEPTION | DIRECT TRANSMISSION | DIRECT RECEPTION |
| File SAVING | PRESENT | PRESENT | ABSENT | ABSENT |
| FUNCTIONAL RESTRICTION | PRESENT | PRESENT | ABSENT | ABSENT |

FIG. 8

CONTENT OF BACKUP COPY FILEn $(1 \leq n1, n2, \cdots ni \leq m)$ $$FILEn = \begin{cases} FOLDERn1 \\ FOLDERn2 \\ \vdots \\ FOLDERni \end{cases}$$

$$E<KB>[E<KM>[FILEn]] = \begin{cases} E<KB>[E<KM>[FOLDERn1]] \\ E<KB>[E<KM>[FOLDERn2]] \\ \vdots \\ E<KB>[E<KM>[FOLDERni]] \end{cases}$$

```
BACKUP APPARATUS HAS BEEN MOUNTED.

PLEASE SELECT FILE TO BE RESTORED
  | FILE NAME      | BACKUP DATE |
  | /**********    | 2006-01-15  |
  | /++++++++++++  | 2006-01-25  |
  | /**********    | 2006-02-17  |
  | /**********    | 2006-03-14  |
  | /++++++++++++  | 2006-04-15  |
  | /**********    | 2006-05-18  |
  | /**********    | 2006-07-09  |
  (SELECT) (CANCEL)          (FRONT) (NEXT)
```

```
BACKUP APPARATUS HAS BEEN MOUNTED.

PLEASE SELECT FOLDER TO BE RESTORED
  | FOLDER NAME    | COMMENT         | DATE       | SIZE     |
  | /**********    | /**********     | 2006-01-01 | *****KB  |
  | /++++++++++++  | /++++++++++++   | 2006-01-01 | *****KB  |
  | /**********    | /**********     | 2006-01-01 | ***KB    |
  | /**********    | /**********     | 2006-01-01 | ***KB    |
  | /++++++++++++  | /++++++++++++   | 2006-01-01 | ++++++KB |
  | /**********    | /**********     | 2006-01-01 | ****KB   |
  | /**********    | /**********     | 2006-01-01 | 0KB      |
  (DECIDE) (CANCEL)                         (FRONT) (NEXT)
```

```
BACKUP APPARATUS HAS BEEN MOUNTED.

DATA RESTORE OPERATION IS STARTED.
       PLEASE WAIT FOR WHILE.
```

FIG. 20

BACKUP SYSTEM FOR IMAGE FORMING APPARATUS AND BACKUP METHOD FOR IMAGE FORMING APPARATUS

CROSS-REFERENCE TO RELATED APPLICATIONS

This application claims the benefit of priority of U.S. Provisional Application No. 60/865,056, filed Nov. 9, 2006, the entire contents of which are incorporated herein by reference.

BACKGROUND

1. Field

The present invention relates to a backup system and method for an image forming apparatus that back up data saved in the image forming apparatus.

2. Description of the Related Art

A hard disk drive (HDD) is mounted in an image forming apparatus such as a copier, a printer, or the like. Various data including data of a copied or printed image may be saved in the HDD. Since the data saved in the HDD may be shared between a plurality of users, this image forming apparatus is very convenient to the users.

It is preferable that the data saved in the HDD of the image forming apparatus is backed up in another storage device. This is because important data to be kept is included in the data saved in the image forming apparatus.

When the data is backed up, the data is kept without loss even when the HDD fails. With the recent development of technology, the large capacity and miniaturization for the storage device such as the HDD or the like are in progress. The image forming apparatus is widely using this large capacity storage device serving as a device for saving data. However, if a large amount of data is saved, it may be difficult to replace the large capacity storage device with a new storage device after reading data at the time of failure. When the data is backed up, an action against the failure of the large capacity storage device may be taken.

When backup is performed, sufficient attention needs to be paid to the confidentiality of the backed-up data.

In many cases, data saved in the image forming apparatus includes confidential information. When the storage device in which data including the confidential information is backed up is lost, there is a risk that the confidential information may be leaked. When a portable device equipped with the HDD serving as the storage device for backup is used, sufficient attention needs to be paid to the confidentiality of the backed-up data. There is a higher possibility of loss in the portable device as compared with other devices.

To increase the confidentiality of data saved in the image forming apparatus, a conventional technology encrypts the data when the data is saved in the HDD of the image forming apparatus. An encryption key to be used upon encryption is pre-stored within the image forming apparatus. When the encrypted data is directly backed up, the confidentiality of the backed-up data is enhanced and the risk that the storage device for backup is lost is reduced since the backed-up data is the encrypted data.

However, an important problem with the confidentiality of data occurs in the conventional technology when the backed-up data is accessed or edited in a personal computer or the like.

When the backed-up data is accessed or edited in the personal computer or the like, the encrypted data is to be decrypted (into plaintext). The decryption requires the same encryption key as that used in the encryption. For this reason, the encryption key is to be extracted outside the image forming apparatus so as to decrypt the backed-up data (or encrypted data). In this case, a method of keeping the encryption key is problematic. When the encryption key is leaked, not only the backed-up data may be leaked, but also the original data saved in the HDD of the image forming apparatus may be leaked.

SUMMARY OF THE INVENTION

The present invention has been made in light of the above situation, and accordingly it is an object of the present invention to provide a backup system for an image forming apparatus in which backed-up data has high confidentiality.

To solve the above problem, the backup system for an image forming apparatus according to one aspect of the present invention is a backup system for an image forming apparatus includes: the image forming apparatus including an original data storage unit configured to store data, the image forming apparatus sending a backup copy of the data; and a backup apparatus electrically communicating with the image forming apparatus, the backup apparatus including a backup copy storage unit configured to save the backup copy received from the image forming apparatus, wherein the image forming apparatus further includes: a key generation unit configured to uniquely generate a key from an input key seed; an encryption and decryption unit configured to execute an encryption process and a decryption process in a symmetric-key cryptosystem using the key generated from the key seed by the key generation unit; and a nonvolatile memory unit configured to pre-store a first key seed, and the backup apparatus further includes: a nonvolatile memory unit configured to pre-store a second key seed, wherein the data stored in the original data storage unit is data encrypted in the cryptosystem using a first key generated from the first key seed by the key generation unit and stored in the original data storage unit, the key generation unit of the image forming apparatus generates a second key from a copy of the second key seed received from the backup apparatus, the encryption and decryption unit of the image forming apparatus performs double encryption by further encrypting the backup copy of at least a part of the data stored in the original data storage unit in the cryptosystem using the second key, and encrypts a copy of the first key seed in the cryptosystem using the second key, and the backup copy storage unit of the backup apparatus stores the double-encrypted backup copy received from the image forming apparatus and the copy of the first key seed encrypted in the cryptosystem using the second key.

Further, to solve the above problem, the backup system for an image forming apparatus according to another aspect of the present invention is a backup system for an image forming apparatus includes: the image forming apparatus including an original data storage unit configured to store data, the image forming apparatus sending a backup copy of the data; and a backup apparatus electrically communicating with the image forming apparatus, the backup apparatus including a backup copy storage unit configured to save the backup copy received from the image forming apparatus, wherein the image forming apparatus further includes: a key generation unit configured to uniquely generate a key from an input key seed; a nonvolatile memory unit configured to pre-store a first key seed; a first encryption and decryption unit configured to execute an encryption process and a decryption process in a first symmetric-key cryptosystem using a first key generated from the first key seed by the key generation unit; and a second encryption and decryption unit configured to execute an encryption process and a decryption process in a second symmetric-key cryptosystem using a second key generated from a second key seed by the key generation unit, and the backup apparatus further includes: a nonvolatile memory unit configured to pre-store the second key seed, wherein the data stored in the original data storage unit is data encrypted in the first cryptosystem using the first key and stored in the original data storage unit, the key generation unit of the image forming apparatus generates the second key from a copy of the second key seed received from the backup apparatus, the second encryption and decryption unit of the image forming apparatus performs double encryption by further encrypting the backup copy of at least a part of the data stored in the original data storage unit in the second cryptosystem using the second key, and encrypts a copy of the first key seed in the second cryptosystem using the second key, and the backup copy storage unit of the backup apparatus stores the double-encrypted backup copy received from the image forming apparatus and the copy of the first key seed encrypted in the second cryptosystem using the second key.

Further, to solve the above problem, the backup system for an image forming apparatus according to further aspect of the present invention is a backup system for an image forming apparatus includes: the image forming apparatus including an original data storage unit configured to store data, the image forming apparatus sending a backup copy of the data; and a backup apparatus electrically communicating with the image forming apparatus, the backup apparatus including a backup copy storage unit configured to save the backup copy received from the image forming apparatus, wherein the image forming apparatus further includes: a key generation unit configured to uniquely generate a key from an input key seed; a nonvolatile memory unit configured to pre-store a first key seed; a first encryption and decryption unit configured to execute an encryption process and a decryption process in a first symmetric-key cryptosystem using a first key generated from the first key seed by the key generation unit; and a second encryption and decryption unit configured to execute an encryption process and a decryption process in a second symmetric-key cryptosystem using a second key generated from a second key seed by the key generation unit, and the backup apparatus further includes: a nonvolatile memory unit configured to pre-store the second key seed, wherein the data stored in the original data storage unit is data encrypted in the first cryptosystem using the first key and stored in the original data storage unit, the key generation unit of the image forming apparatus generates the first key from a copy of the first key seed stored in the nonvolatile memory unit of the image forming apparatus and generates the second key from a copy of the second key seed received from the backup apparatus, the first encryption and decryption unit of the image forming apparatus creates plaintext by decrypting the backup copy of at least a part of the data stored in the original data storage unit in the first cryptosystem using the first key, the second encryption and decryption unit of the image forming apparatus encrypts the backup copy converted into the plaintext in the second cryptosystem using the second key, and the backup copy storage unit of the backup apparatus stores the backup copy encrypted in the second cryptosystem using the second key received from the image forming apparatus.

Further more, to solve the above problem, the backup method for an image forming apparatus according to further aspect of the present invention is a backup method for an image forming apparatus of backing up data stored in an original data storage unit of the image forming apparatus in a backup copy storage unit of a backup apparatus, includes: encrypting, by the image forming apparatus, the data in a first cryptosystem using a first key and storing the encrypted data in the original data storage unit; receiving, by the image forming apparatus, a copy of a second key seed from the backup apparatus; generating, by the image forming apparatus, a second key from the received copy of the second key seed; performing, by the image forming apparatus, double encryption by further encrypting a backup copy of at least a part of the data stored in the original data storage unit in a second cryptosystem using the second key; encrypting, by the image forming apparatus, a copy of the first key seed in the second cryptosystem using the second key; receiving, by the backup apparatus, the double-encrypted backup copy and the copy of the first key seed encrypted in the second cryptosystem using the second key from the image forming apparatus; and storing, by the backup copy storage unit of the backup apparatus, the double-encrypted backup copy received from the image forming apparatus and the copy of the first key seed encrypted in the second cryptosystem using the second key.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 8 is an illustrative view showing an example in which a function of the MFP is restricted by a function restriction unit of the CPU of the MFP while the backup process and the restore process are in operation, FIG. 20 is an illustrative view showing an example of various images to be displayed to the display input apparatus of the operation panel at the time of the selection reception process for a folder to be restored.

DETAILED DESCRIPTION

Hereinbelow, a description will be given of a backup system and method for an image forming apparatus according to an embodiment of the present invention with reference to the drawings.

(1) First Embodiment (1-1) Configuration

The image forming apparatus can use a multi function peripheral (MFP) equipped with a copy function, a printer function, a facsimile function, a scanner function, or the like. In the following description, an example of using the MFP as the image forming apparatus will be described.

Figure 1:
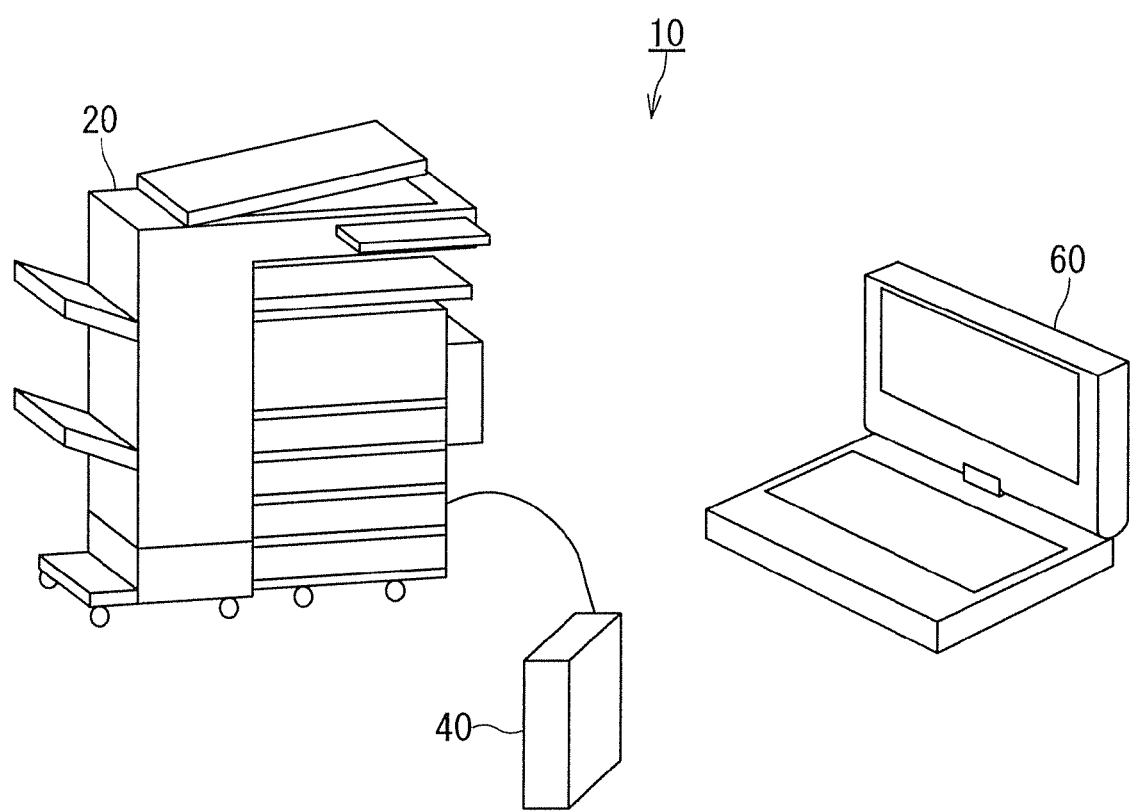
FIG. 1 is a schematic overall configuration diagram showing a first embodiment of a backup system for an image forming apparatus according to the present invention.

FIG. 1 is a schematic overall configuration diagram showing a first embodiment of a backup system for an image forming apparatus according to the invention. In FIG. 1, there is shown a connection relation of the backup system for the image forming apparatus in a process of backing up data of the MFP in the backup apparatus and a process of restoring the backed-up data of the backup apparatus in the MFP.

A backup system 10 for the image forming apparatus has an MFP 20 serving as the image forming apparatus, a backup apparatus 40 capable of being electrically connected to the MFP 20, and a backup copy edition apparatus (or edition apparatus) 60 capable of being electrically connected to the backup apparatus 40.

Additionally, in the following description, an example of using a notebook type personal computer as the edition apparatus 60 is shown.

(1-1-1) Configuration of the MFP 20

First, a configuration of the MFP 20 will be briefly described.

Figure 2:
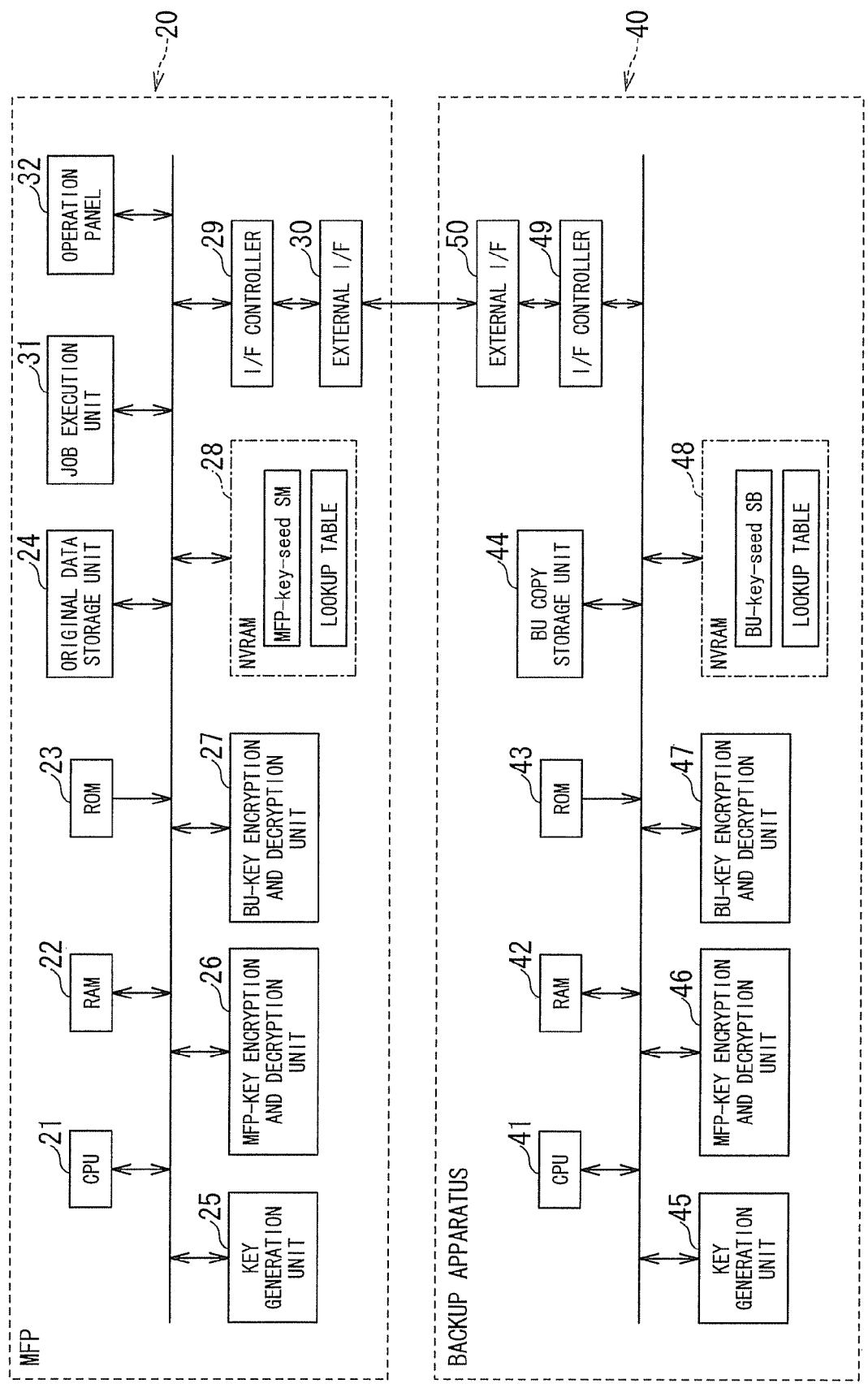
FIG. 2 is a schematic block diagram showing a configuration example of an MFP and a backup apparatus.

FIG. 2 is a schematic block diagram showing a configuration example of the MFP 20 and the backup apparatus 40.

As shown in FIG. 2, the MFP 20 has a CPU 21, a RAM 22, a ROM 23, an original data storage unit 24, a key generation unit 25, an MFP-key encryption and decryption unit 26 serving as a first encryption and decryption unit, a BU-key encryption and decryption unit 27 serving as a second encryption and decryption unit, an NVRAM 28, an interface controller 29, an external interface 30, a job execution unit 31, and an operation panel 32.

The CPU 21 of the MFP 20 controls a processing operation of the MFP 20 according to program stored in the ROM 23 of the MFP 20. The CPU 21 loads a backup program for the MFP 20 stored in the ROM 23 and data required for running the program to the RAM 22 of the MFP 20. Moreover, the CPU 21 executes a process of backing up data of the MFP 20 in the backup apparatus 40 and a process of restoring the backed-up data of the backup apparatus 40 in the MFP 20 by cooperating with a CPU 41 of the backup apparatus 40 according to backup program of the MFP 20.

The RAM 22 provides a work area temporarily storing data and a program to be run by the CPU 21.

The ROM 23 stores a start program of the MFP 20, the backup program for the MFP 20, and various data required to run these programs.

In addition, the ROM 23 can have a configuration including a recording medium readable by the CPU 21 such as a magnetic or optical recording medium, a semiconductor memory, or the like and can be configured such that a program and data within the ROM 23 is partially or totally downloaded through an electronic network.

The original data storage unit 24 of the MFP 20 stores various data including image data using a copy function, a printer function, a facsimile function, and a scanner function of the MFP 20. The data can be divided into folders according to application. When the data is stored in the original data storage unit 24 in the case where the data is divided into the folders, the MFP-key encryption and decryption unit 26 serving as the first encryption and decryption unit of the MFP 20 performs encryption in a first symmetric-key cryptosystem using a specific key of the MFP 20 (MFP-key KM) serving as a first key on a folder-by-folder basis.

That is, since all data stored in the original data storage unit 24 is encrypted data, plaintext data is not easily leaked even when a rogue third party acquires the original data storage unit 24.

The key generation unit 25 of the MFP 20 uniquely generates a key from an input key seed. To uniquely generate the key from the input key seed, for example, it is possible to use a lookup table in which key seeds and keys are mapped in one-to-one correspondence or use a program. In the following description, there is shown an example in which the key generation unit 25 of the MFP 20 uses the lookup table pre-stored in the NVRAM 28 serving as a nonvolatile memory unit of the MFP 20.

A specific key seed of the MFP 20 (MFP-key-seed SM) serving as a first key seed is pre-stored in the NVRAM 28. Moreover, a specific key seed of the backup apparatus 40 (BU-key-seed SB) serving as a second key seed is pre-stored in an NVRAM 48 serving as a nonvolatile memory unit of the backup apparatus 40.

When the MFP-key-seed SM is input, the key generation unit 25 of the MFP 20 uniquely generates a specific key of the MFP 20 (MFP-key KM) serving as a first key. When the BU-key-seed SB is input, the key generation unit 25 uniquely generates a specific key of the backup apparatus 40 (BU-key KB) serving as a second key.

In addition, it is desirable to store the key generated by the key generation unit 25 in a volatile memory medium such as the RAM 22 or the like. Sufficient attention needs to be paid to prevent the MFP-key KM or BU-key KB used for encryption from externally being leaked according to data security. As the key is stored in the volatile memory medium, the key is erased from the MFP 20 when at least the MFP 20 is powered off.

The MFP-key encryption and decryption unit 26 serving as the first encryption and decryption unit of the MFP 20 uses the MFP-key KM generated from the MFP-key-seed SM by the key generated unit 25 and executes an encryption process and a decryption process in a first symmetric-key cryptosystem.

The BU-key encryption and decryption unit 27 serving as the second encryption and decryption unit of the MFP 20 uses the BU-key KB generated from the BU-key-seed SB by the key generated unit 25 and executes an encryption process and a decryption process in a second symmetric-key cryptosystem.

In addition, the first and second symmetric-key cryptosystems can use, for example, an advanced encryption standard (AES) or triple data encryption standard (3 DES) The first and second symmetric-key cryptosystems can be the same symmetric-key cryptosystem. In this case, the MFP-key encryption and decryption unit 26 and the BU-key encryption and decryption unit 27 are set to a single encryption and decryption unit. The single encryption and decryption unit can execute the encryption process and the decryption process using the MFP-key KM and the BU-key KB.

In the following description, an example in which the first and second symmetric-key cryptosystems are the same symmetric-key cryptosystem will be described. Data encrypted with the MFP-key KM in the symmetric-key cryptosystem is denoted by E<KM>[data], and data encryption with the BU-key KB is denoted by E<KB>[data].

The NVRAM 28 pre-stores the MFP-key-seed SM and the lookup table in which key seeds and keys are mapped in one-to-one correspondence. To prevent a robbery by other persons, it is desirable that the NVRAM 28 uses an on-board flash memory directly constituted on a board that is difficult to be independently extracted.

To establish a connection for enabling electrical communication with the backup apparatus 40, the interface controller 29 and the external interface 30 of the MFP 20 are provided in the same standard as those of the backup apparatus 40. For example, the standard of the interface controller 29 and the external interface 30 can use a universal serial bus (USB), an IEEE1394 standard, or the like.

The job execution unit 31 realizes various functions including a copy function, a printer function, a facsimile function, a scanner function, and the like of the MFP 20.

The operation panel 32 has a hard key such as a button or the like for sending a specific instruction signal to the CPU when an operator makes a press and a display input apparatus.

The display input apparatus has an LCD serving as a display and a touch panel provided in the vicinity of the LCD. The LCD is controlled by the CPU 21 and displays information for operating the MFP 20 and a plurality of keys (hereinafter, referred to as soft keys) for operating the MFP 20. The touch panel provides the CPU 21 with information of a position indicated by the operator on the touch panel.

For example, when the operator intends to press one of the soft keys on a screen displayed on the LCD, the operator makes contact with a portion corresponding to the soft key on the screen. The touch panel provides the CPU 21 of the MFP 20 with information acquired from the contact operation by acquiring, for example, information of a position where infrared light is intercepted as information of an indication position of the operator.

(1-1-2) Configuration of the Backup Apparatus 40

Next, a configuration of the backup apparatus 40 will be briefly described.

As shown in FIG. 2, the backup apparatus 40 has the CPU 41, a RAM 42, a ROM 43, a backup copy storage unit 44, a key generation unit 45, an MFP-key encryption and decryption unit 46 serving as a first encryption and decryption unit, a BU-key encryption and decryption unit 47 serving as a second encryption and decryption unit, the NVRAM 48, an interface controller 49, and external interface 50.

The CPU 41 of the backup apparatus 40 controls a processing operation of the backup apparatus 40 according to program stored in the ROM 43 of the backup apparatus 40. The CPU 41 loads a backup program for the backup apparatus 40 stored in the ROM 43 and data required for running the program to the RAM 42 of the backup apparatus 40. Moreover, the CPU 41 executes a process of backing up data of the MFP 20 in the backup apparatus 40 and a process of restoring the backed-up data of the backup apparatus 40 in the MFP 20 by cooperating with the CPU 21 of the MFP 20 according to backup program of the backup apparatus 40.

The CPU 41 loads a backup copy edit program for the backup apparatus 40 stored in the ROM 43 and data required for running the program to the RAM 42. Moreover, the CPU 41 executes a process of editing a backup copy stored in the backup copy storage unit 44 by cooperating with a CPU 61 of an edition apparatus 60 according to backup copy edit program for the backup apparatus 40.

The RAM 42 provides a work area temporarily storing data and a program to be run by the CPU 41.

The ROM 43 stores a start program of the backup apparatus 40, the backup program for the backup apparatus 40, the backup copy edit program for the backup apparatus 40, and various data required to run these programs.

In addition, the ROM 43 can have a configuration including a recording medium readable by the CPU 41 such as a magnetic or optical recording medium, a semiconductor memory, or the like and can be configured such that a program and data within the ROM 43 is partially or totally downloaded through an electronic network.

The backup copy storage unit 44 of the backup apparatus 40 saves data received from the MFP 20.

The key generation unit 45 of the backup apparatus 40 has the same configuration as the key generation unit 25 of the MFP 20 and uniquely generates a key from an input key seed. A lookup table used in the key generation unit 45 is the same as that used in the key generation unit 25. In the following description, there is shown an example in which the key generation unit 45 of the backup apparatus 40 uses the lookup table pre-stored in the NVRAM 48 serving as a nonvolatile memory unit of the backup apparatus 40.

The key generation unit 25 and the key generation unit 45 generate a key from a key seed using the lookup tables having the same content. Consequently, the key generation unit 25 and the key generation unit 45 generate the key from the same key seed.

That is, like the key generation unit 25, the key generation unit 45 uniquely generates an MFP-key KM when an MFP-key-seed SM is input, and uniquely generates a BU-key KB when a BU-key-seed SB is input.

In addition, it is desirable to store the key generated by the key generation unit 25 and the key generation unit 45 in a volatile memory medium such as the RAM 22, the RAM 42, or the like. Sufficient attention needs to be paid to prevent the MFP-key KM or BU-key KB used for encryption from externally being leaked according to data security. As the key is stored in the volatile memory medium, the key is erased from each apparatus when at least the MFP 20 and the backup apparatus 40 are respectively powered off.

The MFP-key encryption and decryption unit 46 serving as the first encryption and decryption unit of the backup apparatus 40 has the same configuration as the MFP-key encryption and decryption unit 26 serving as the first encryption and decryption unit of the MFP 20, uses the MFP-key KM generated from the MFP-key-seed SM by the key generated unit 45, and executes an encryption process and a decryption process in a first symmetric-key cryptosystem.

The BU-key encryption and decryption unit 47 serving as the second encryption and decryption unit of the backup apparatus 40 has the same configuration as the BU-key encryption and decryption unit 27 serving as the second encryption and decryption unit of the MFP 20, uses the BU-key KB generated from the BU-key-seed SB by the key generated unit 45, and executes an encryption process and a decryption process in a second symmetric-key cryptosystem.

When the MFP-key encryption and decryption unit 26 and the BU-key encryption and decryption unit 27 are set to a single encryption and decryption unit, the MFP-key encryption and decryption unit 46 and the BU-key encryption and decryption unit 47 can be set to a single encryption and decryption unit.

The NVRAM 48 pre-stores the MFP-key-seed SM and the lookup table in which key seeds and keys are mapped in one-to-one correspondence. To prevent a robbery by other persons, it is desirable that the NVRAM 48 uses an on-board flash memory directly constituted on a board that is difficult to be independently extracted, like the NVRAM 28 of the MFP 20.

To establish a connection for enabling electrical communication with the MFP 20, the interface controller 49 and the external interface 50 of the backup apparatus 40 are provided in the same standard as those of the MFP 20.

(1-1-3) Configuration of the Edition Apparatus 60

Figure 3:
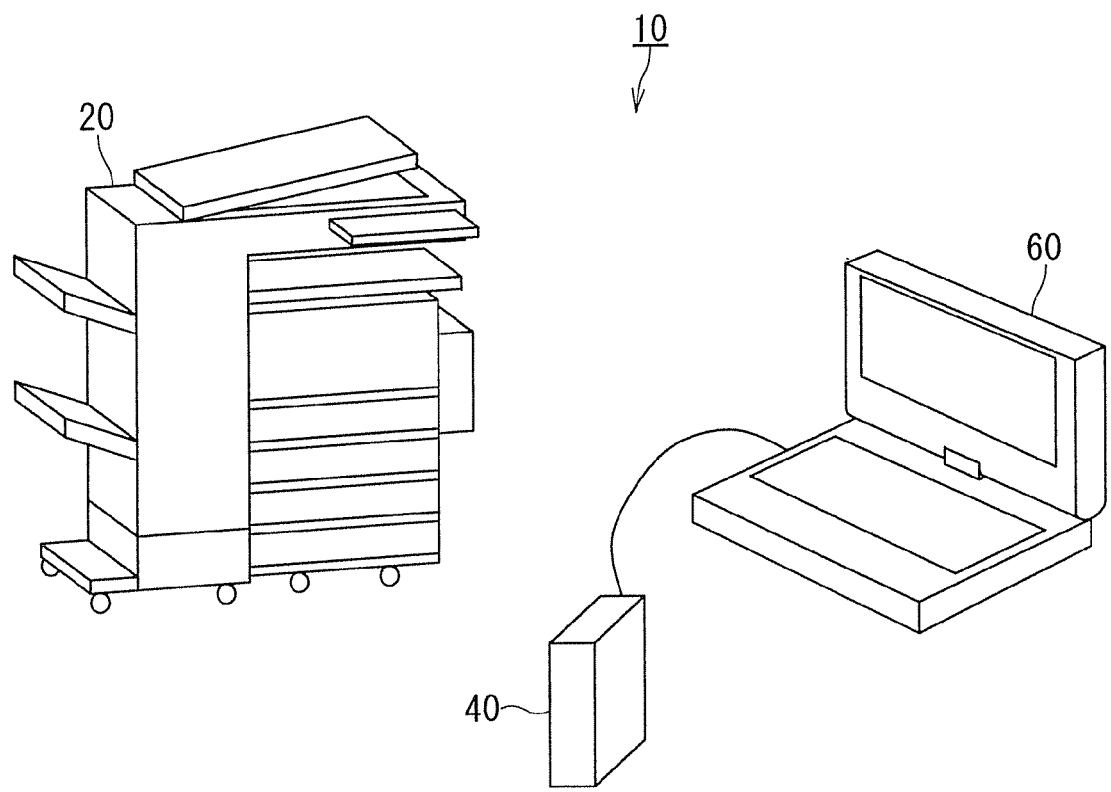
FIG. 3 is a schematic overall configuration diagram showing a connection relation of the backup system for the image forming apparatus in a process of editing a backup copy stored in the backup apparatus with an edition apparatus.

FIG. 3 is a schematic overall configuration diagram showing a connection relation of the backup system 10 for the image forming apparatus in a process of editing a backup copy stored in the backup apparatus 40 with the edition apparatus.

Figure 4:
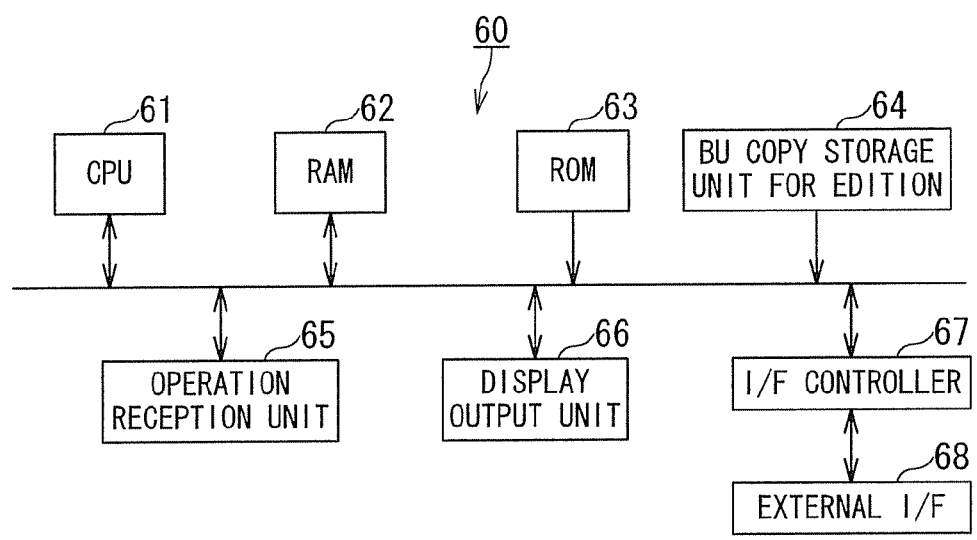
FIG. 4 is a schematic block diagram showing a configuration example of the edition apparatus.

FIG. 4 is a schematic block diagram showing a configuration example of the edition apparatus 60.

The edition apparatus 60 has the CPU 61, a RAM 62, a ROM 63, a backup copy storage unit 64, an operation reception unit 65, a display output unit 66, an interface controller 67, and an external interface 68.

The CPU 61 of the edition apparatus 60 controls a processing operation of the edition apparatus 60 according to program stored in the ROM 63 of the edition apparatus 60. The CPU 61 loads a backup copy edit program for the edition apparatus 60 stored in the ROM 63 and data required for running the program to the RAM 62 of the edition apparatus 60. Moreover, the CPU 61 executes a process of editing a backup copy stored in the backup copy storage unit 44 using the edition apparatus 60 by cooperating with the CPU 41 of the backup apparatus 40 according to backup copy edit program for the edition apparatus 60.

The RAM 62 provides a work area temporarily storing data and a program to be run by the CPU 61.

The ROM 63 stores a start program of the edition apparatus 60, the backup copy edit program for the edition apparatus 60, and various data required to run these programs.

In addition, the ROM 63 can have a configuration including a recording medium readable by the CPU 61 such as a magnetic or optical recording medium, a semiconductor memory, or the like and can be configured such that a program and data within the ROM 63 is partially or totally downloaded through an electronic network.

The backup copy storage unit 64 for edition temporarily stores a backup copy for edition received from the backup apparatus 40 as long as the backup copy is required for edition. All information stored in the backup copy storage unit 64 for edition is erased by the CPU 61 after the backup copy is completely edited.

The operation reception unit 65 is configured with a general input apparatus such as, for example, a keyboard, a touch panel, a numeric pad, or the like, and outputs an operation input signal corresponding to an operation of a user to the CPU 61.

The display output unit 66 is configured with a general display output apparatus such as, for example, a liquid crystal display, a CRT display, or the like, and displays various information under control of the CPU 61.

To establish a connection for enabling electrical communication with the backup apparatus 40, the interface controller 67 and the external interface 68 of the edition apparatus 60 are provided in the same standard as at least those of the backup apparatus 40. In addition, a standard for connecting the backup apparatus 40 to the MFP 20 can be different from that for connecting the edition apparatus 60 to the backup apparatus 40. When the standards are different, it is desirable to provide a corresponding external interface and a corresponding interface controller in each apparatus.

(1-1-4) Configuration of Units for Realizing Functions by the CPU 21

Figure 5:
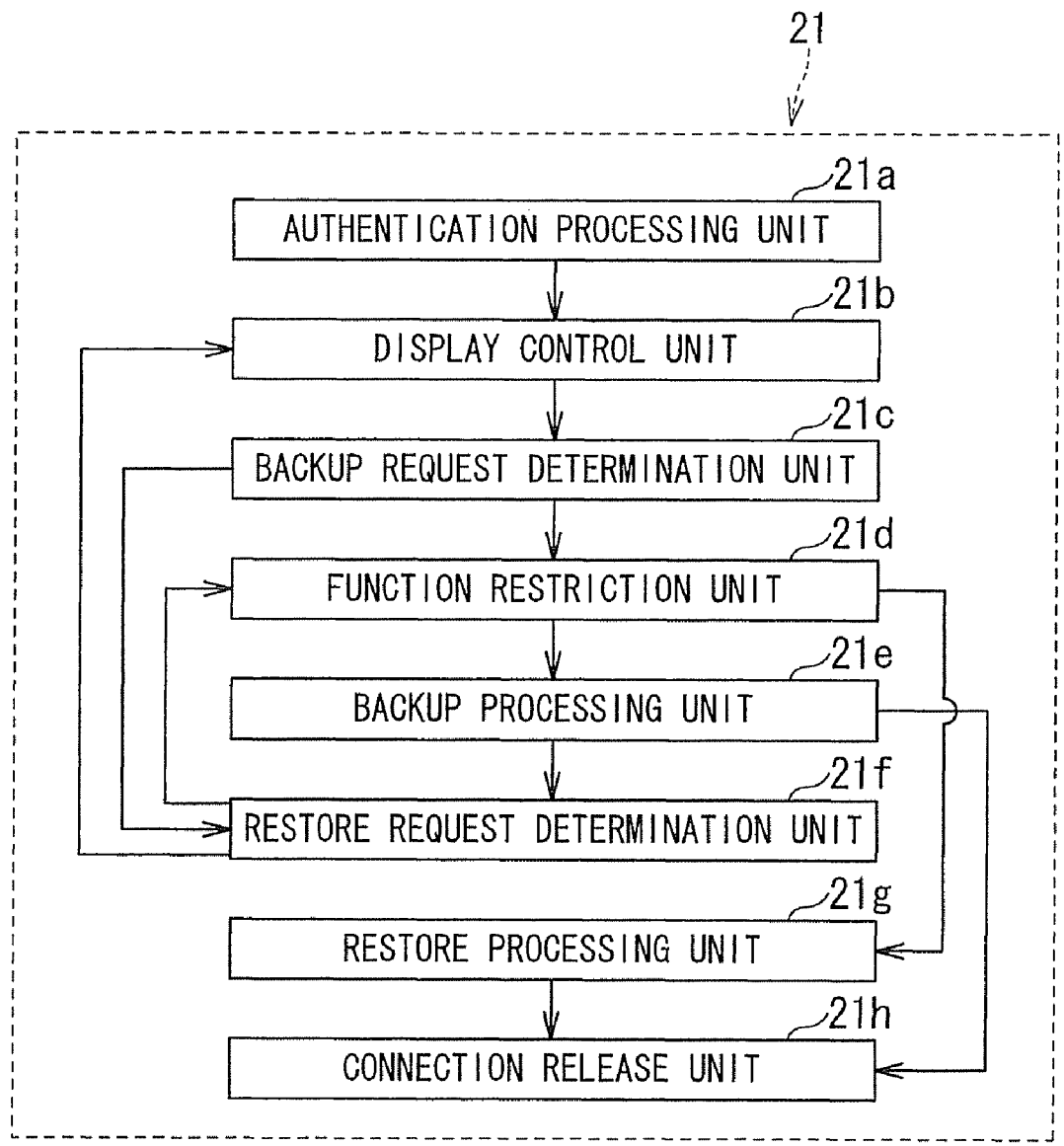
FIG. 5 is a schematic block diagram showing a configuration example of units for realizing functions by a CPU of the MFP shown in FIG. 2.

FIG. 5 is a schematic block diagram showing a configuration example of units for realizing functions by the CPU 21 of the MFP 20 shown in FIG. 2. The units for realizing functions can be configured with a hardware logic of a circuit or the like without use of the CPU 21.

The CPU 21 functions as at least an authentication processing unit 21a, a display control unit 21b, a backup request determination unit 21c, a function restriction unit 21d, a backup processing unit 21e, a restore request determination unit 21f, a restore processing unit 21g, and a connection release unit 21h according to the backup program for the MFP 20. The units 21a to 21h use a required work area of the RAM 22 as a temporary storage space of data.

Next, the units 21a to 21h of the CPU will be described.

When the backup apparatus 40 is connected to the MFP 20 such that electrical communication is enabled, the authentication processing unit 21a executes the process of authentication of the backup apparatus 40 and the user which includes a process of displaying information indicating that the backup apparatus 40 is connected on the display input apparatus of the operation panel 32.

The display control unit 21b receives the information indicating that the backup apparatus 40 is connected from the authentication processing unit 21a and displays a backup or restore check image on the display input apparatus of the operation panel 32 for receiving the user's selection as to whether to execute either the process of backing up data of the MFP 20 in the backup apparatus 40 or the process of restoring a backup copy from the backup apparatus 40 to the MFP 20.

The backup request determination unit 21c determines whether the user makes an instruction to execute the backup process through the display input apparatus of the operation panel 32 on the basis of the backup or restore check image.

The function restriction unit 21d restricts part of a function of the MFP 20 to be realized in the job execution unit 31. The restricted function is a function requiring a write operation to the original data storage unit 24.

The backup processing unit 21e executes the process of backing up the data of the MFP 20 in the backup apparatus 40 while maintaining the backed-up data with high confidentiality.

The restore request determination unit 21f determines whether the user makes an instruction to execute the restore process through the display input apparatus of the operation panel 32 on the basis of the backup or restore check image.

The restore processing unit 21g executes the process of restoring a backup copy from the backup apparatus 40 to the MFP 20 while maintaining the backed-up data with high confidentiality.

The connection release unit 21h releases a connection of the MFP 20 and the backup apparatus 40 and disables an electrical communication state therebetween.

(1-2) Operation

Next, an example of an operation of the backup system 10 for the image forming apparatus according to this embodiment will be described.

(1-2-1) Main Process

Figure 6:
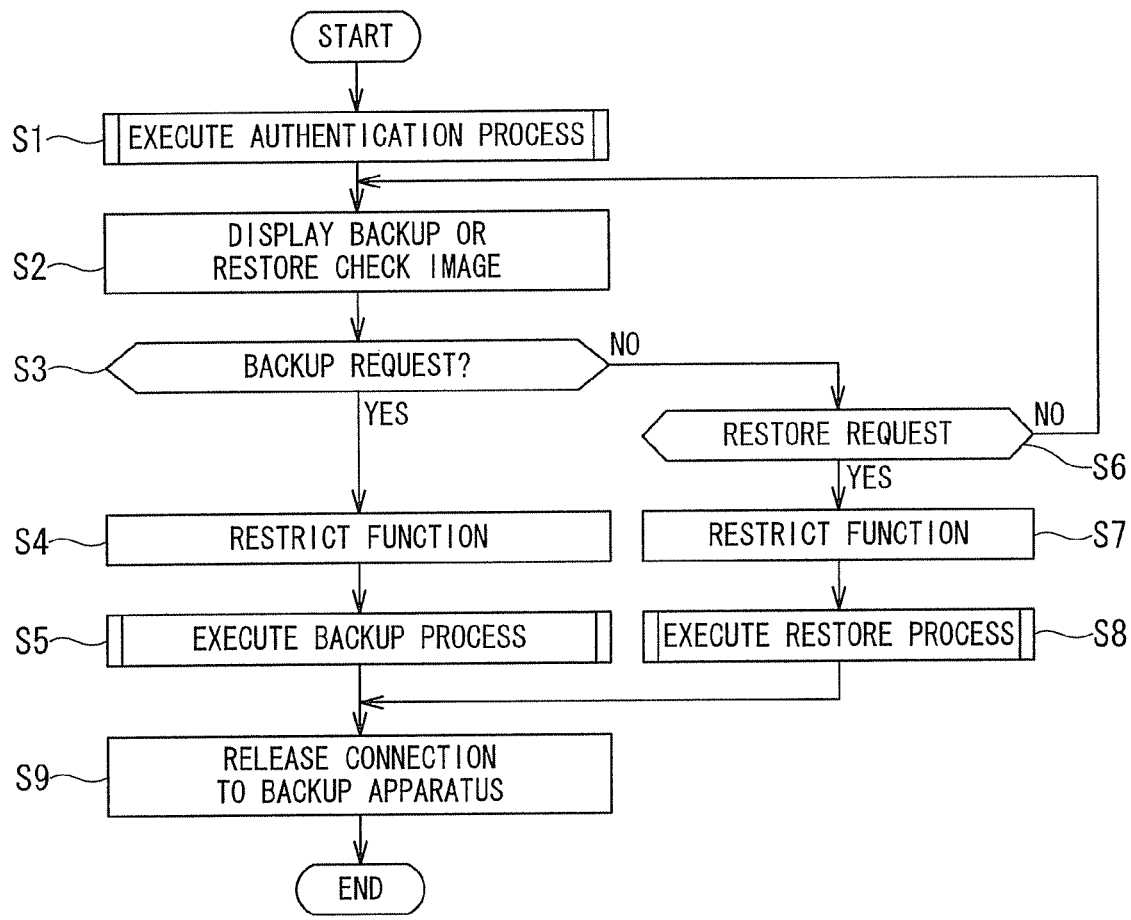
FIG. 6 is a flowchart showing a procedure when performing a process of backing up data in the backup apparatus while maintaining the backed-up data with high confidentiality and a process of restoring a backup copy from the backup apparatus to the MFP.

FIG. 6 is a flowchart showing a procedure when performing a process of backing up data of the MFP 20 in the backup apparatus 40 while maintaining the backed-up data with high confidentiality (hereinafter, referred to as a backup process) and a process of restoring a backup copy from the backup apparatus 40 to the MFP 20 (hereinafter, referred to as a backup process). In FIG. 6, a code in which a numeral is added to S denotes each step of the flowchart.

This procedure is started when the backup apparatus 40 is connected to electrically communicate with the MFP 20 through the external interfaces 30 and 50.

First, in step S1, the authentication processing unit 21a executes the authentication process of the backup apparatus 40 and the user so as to prevent impersonation or the like.

Figure 7:
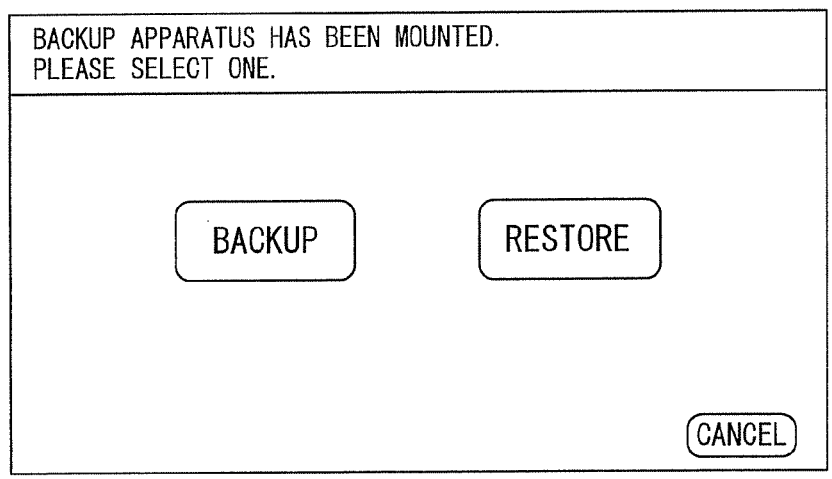
FIG. 7 is an illustrative view showing an example of a backup or restore check image.

FIG. 7 is an illustrative view showing an example of a backup or restore check image.

In step S2, the display control unit 21b receives information indicating that the backup apparatus 40 is connected from the authentication processing unit 21a and displays a backup or restore check image for receiving the user's selection as to whether to execute either the backup process or the restore process on the display input apparatus of the operation panel 32 as shown in FIG. 7.

Next, in step S3, the backup request determination unit 21c determines whether the user makes an instruction to execute the backup process through the display input apparatus of the operation panel 32 on the basis of the backup or restore check image. When the user has made the instruction to execute the backup process, the procedure proceeds to step S4. Otherwise, the procedure proceeds to step S6.

FIG. 8 is an illustrative view showing an example in which a function of the MFP 20 is restricted by the function restriction unit 21d while the backup process and the restore process are in operation.

Next, in step S4, the function restriction unit 21d restricts part of a function of the MFP 20 to be realized in the job execution unit 31. During the backup process, a backup copy of data stored in the original data storage unit 24 is created. For this reason, a process of changing data stored in the original data storage unit 24 needs to be restricted during the backup process. Consequently, the function restriction unit 21d restricts a function requiring a write operation to the original data storage unit 24. When there is a function currently operating in the job execution unit 31, the function requiring the write operation to the original data storage unit 24 is restricted after the function in operation is completed. On the other hand, in terms of a function that does not require the write operation to the original data storage unit 24, the convenience for the user is preferred and the restriction is not made.

Next, in step S5, the backup processing unit 21e executes the process of backing up the data of the MFP 20 in the backup apparatus 40 while maintaining the backed-up data with high confidentiality.

On the other hand, upon determining that the user does not make any instruction to execute the backup process in step S3, the restore request determination unit 21f determines whether the user makes an instruction to execute the restore process through the display input apparatus of the operation panel 32 on the basis of the backup or restore check image in step S6. When the user has made the instruction to execute the restore process, the procedure proceeds to step S7. Otherwise, the procedure returns to step S2.

Next, in step S7 like step S4, the function restriction unit 21d restricts a function requiring the write operation to the original data storage unit 24. The restricted function is the same as a function restricted to execute the backup process in step S4 (see FIG. 8). When there is a function currently operating in the job execution unit 31, the function requiring the write operation to the original data storage unit 24 is restricted after the function in operation is completed. On the other hand, in terms of a function that does not require the write operation to the original data storage unit 24, the convenience for the user is preferred and the restriction is not made.

Next, in step S8, the restore processing unit 21g executes the process of restoring a backup copy from the backup apparatus 40 to the MFP 20 while maintaining the backed-up data with high confidentiality.

Next, in step S9, The connection release unit 21h releases a connection to the backup apparatus 40 by receiving information indicating that the backup process or the restore process is completed from the backup processing unit 21e or the restore processing unit 21g.

According to the above-described procedure, there can be executed a process of backing up data of the MFP 20 in the backup apparatus 40 while maintaining the backed-up data with high confidentiality and a process of restoring a backup copy from the backup apparatus 40 to the MFP 20.

(1-2-2) Authentication Process

Subsequently, a procedure of an authentication process of the backup apparatus 40 and the user will be described.

Figure 9:
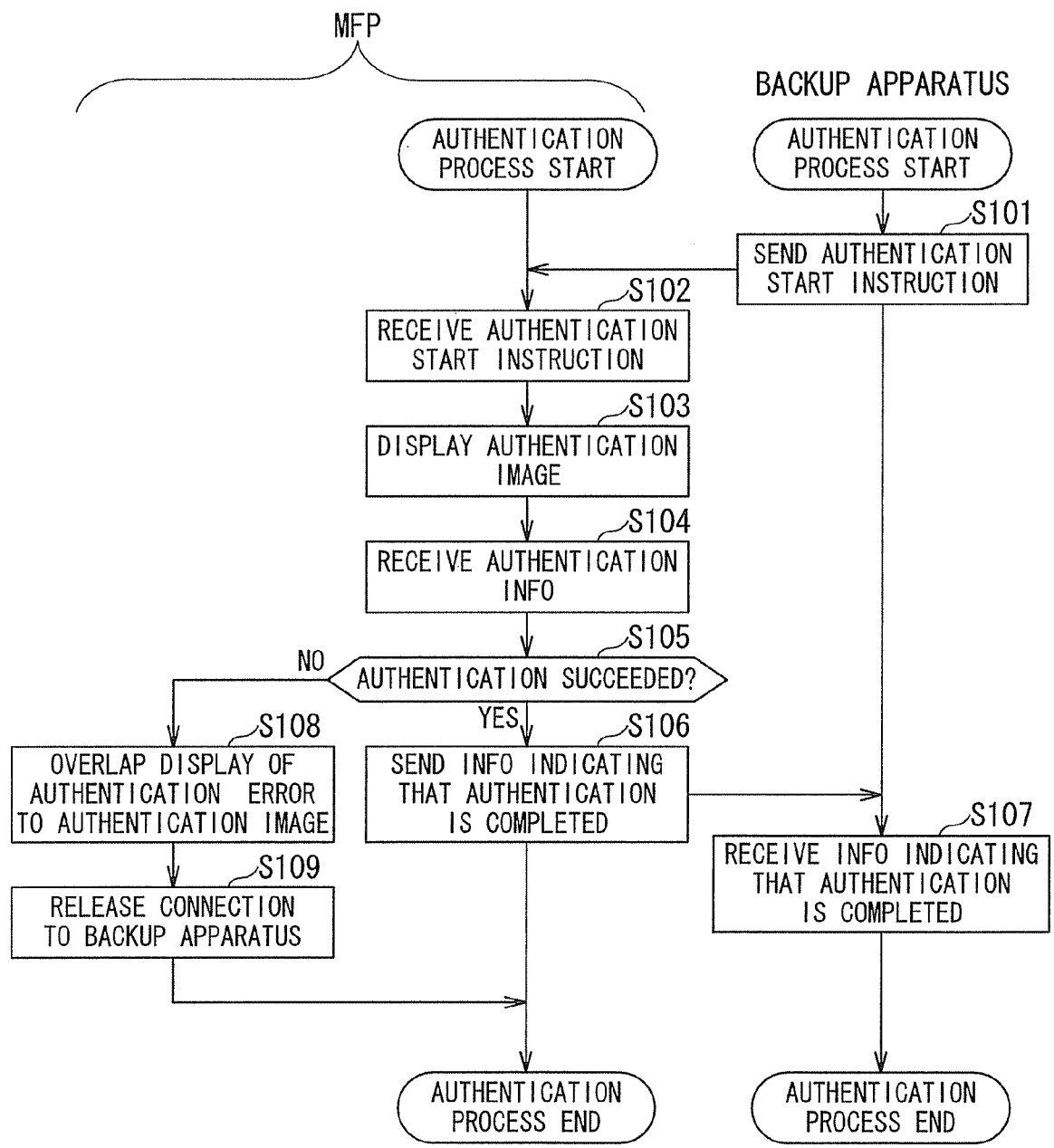
FIG. 9 is a subroutine flowchart showing a procedure of an authentication process of the backup apparatus and a user that is executed by an authentication processing unit in step S1 of FIG. 6.

FIG. 9 is a subroutine flowchart showing the procedure of the authentication process of the backup apparatus 40 and the user that is executed by the authentication processing unit 21a in step S1 of FIG. 6. In FIG. 9, a code in which a numeral is added to S denotes each step of the flowchart.

First, in step S101, the CPU 41 of the backup apparatus 40 provides the MFP 20 with an instruction (or authentication start instruction) to start the authentication process of the backup apparatus 40 and the user.

Next, in step S102, the authentication processing unit 21a of the CPU 21 of the MFP 20 receives the authentication start instruction.

Figure 10:
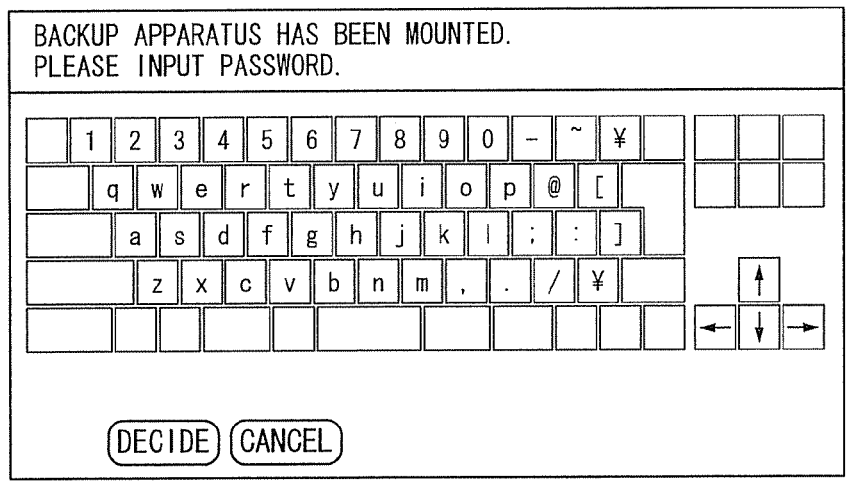
FIG. 10 is an illustrative view showing an example of an image (or authentication image) for performing the authentication of the backup apparatus and the user.

FIG. 10 is an illustrative view showing an example of an image (or authentication image) for performing the authentication of the backup apparatus 40 and the user.

Next, in step S103, the authentication processing unit 21a allows the display input apparatus of the operation panel 32 to display the image (or authentication image) for performing the authentication of the backup apparatus 40 and the user, including the image indicating that the backup apparatus 40 is connected.

Next, in step S104, the authentication processing unit 21a executes the process of authentication of the backup apparatus 40 and the user. The authentication processing unit 21a receives information from the CPU 41 of the backup apparatus 40 required to perform the user authentication such as an administrator password or the like input from the user through the display input apparatus of the operation panel 32. The authentication processing unit 21a also receives information from the CPU 41 of the backup apparatus 40 for specifying the backup apparatus 40 required to perform the authentication of the backup apparatus 40. When E<KM>[SM] is already stored in the backup copy storage unit 44, E<KM>[SM] can be included in the information for specifying the backup apparatus 40.

Next, in step S105, the authentication processing unit 21a determines whether the authentication of the backup apparatus 40 and the user has succeeded on the basis of the received authentication information. When the authentication has succeeded, the procedure proceeds to step S106. On the other hand, when the authentication has failed, the procedure proceeds to step S108.

Next, in step S106, the authentication processing unit 21a provides the backup apparatus 40 with information indicating that the authentication has succeeded and has been normally completed.

Next, in step S107, the MFP 20 receives the information indicating that the authentication is completed, such that the procedure of a sequence of authentication processes is completed.

On the other hand, when the authentication has failed in step S105, the authentication processing unit 21a displays an image for providing the user with information indicating that the authentication has failed on the display input apparatus of the operation panel 32 in step 108.

Next, in step S109, the authentication processing unit 21a releases a connection of the MFP 20 and the backup apparatus 40, such that the procedure of a sequence of authentication processes is completed.

(1-2-3) Backup Process

Subsequently, the procedure of a process of backing up data of the MFP 20 in the backup apparatus 40 while maintaining the backed-up data with high confidentiality will be described.

Figure 11:
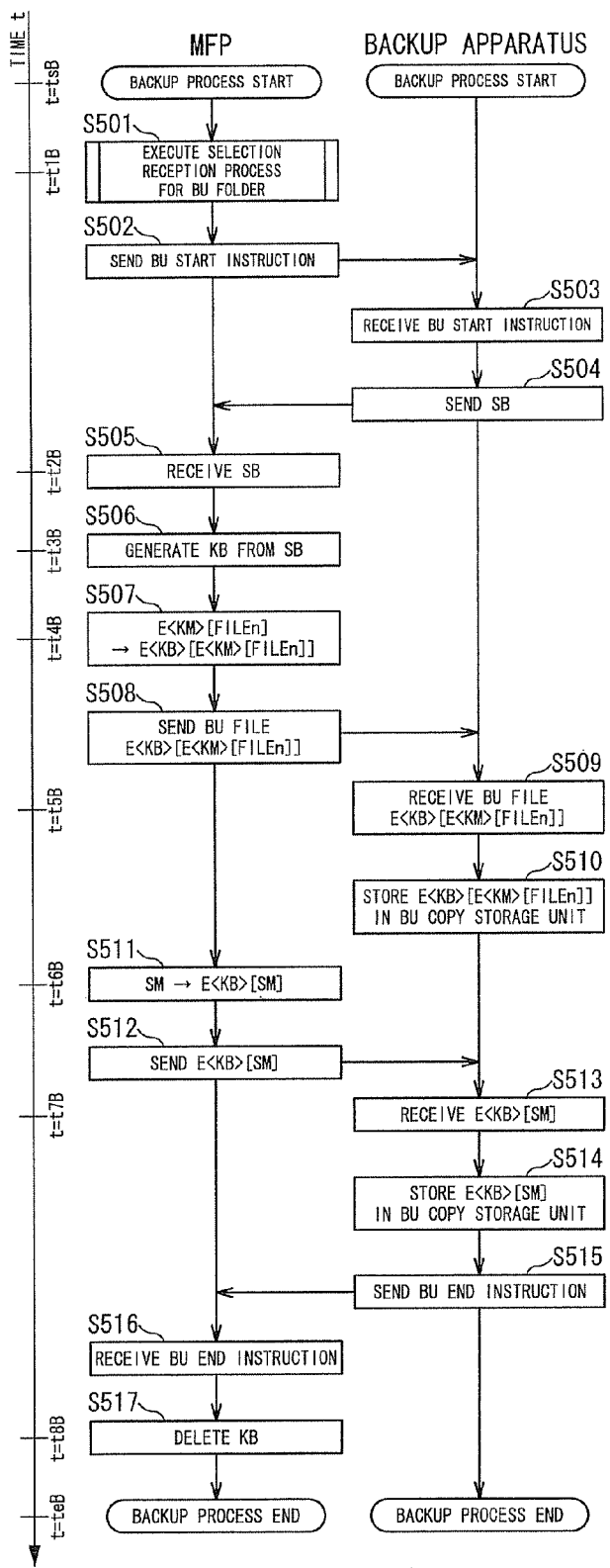
FIG. 11 is a subroutine flowchart showing a procedure of the backup process to be executed by the backup processing unit in step S5 of FIG. 6.

FIG. 11 is a subroutine flowchart showing the procedure of the backup process to be executed by the backup processing unit 21e in step S5 of FIG. 6. In FIG. 11, a code in which a numeral is added to S denotes each step of the flowchart. In this procedure, the CPU 41 of the backup apparatus 40 executes various processes according to backup program for the backup apparatus 40.

Figure 12:
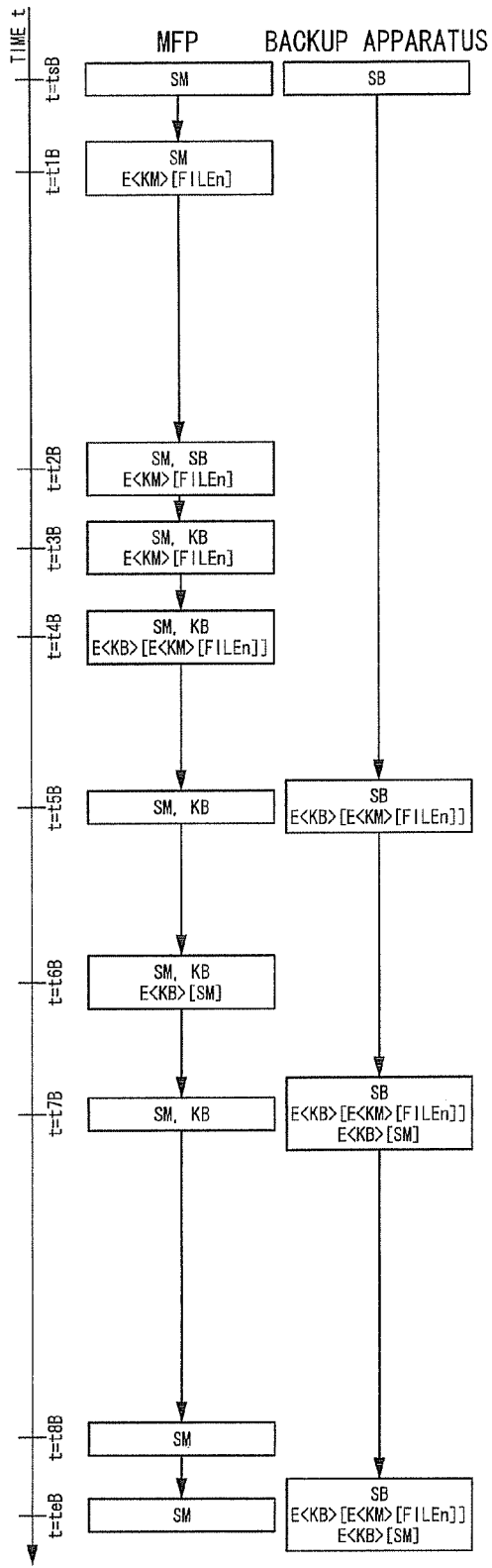
FIG. 12 is a state transition diagram briefly showing the transition of data to be retained by the MFP and the backup apparatus in the backup process.

FIG. 12 is a state transition diagram briefly showing the transition of data to be retained by the MFP 20 and the backup apparatus 40 in the procedure of the backup process.

In FIGS. 11 and 12, the same time t is the same point of time.

When data retained by the MFP 20 and the backup apparatus 40 are compared at a start time ($t=tsB$) and an end time ($t=teB$) in the procedure of the backup process of FIG. 12, it is obvious that an MFP-key-seed SM (E<KB>[SM]) of a specific encryption key seed of the MFP 20 encrypted with a BU-key KB of a specific encryption key of the backup apparatus 40 and a backup copy FILEn (E<KB>[E<KM>[FILEn]]) selected from data stored in the original data storage unit 24 double-encrypted according to encryption in the MFP-key KM and encryption in the BU-key KB are given to the backup apparatus 40 in the backup procedure shown in FIG. 11.

First, in step S501, the backup processing unit 21e executes a process of receiving information of data to be backed up by allowing the user to select the data to be backed up from data stored in the original data storage unit 24 (or a selection reception process for a folder to be backed up).

Figure 13:
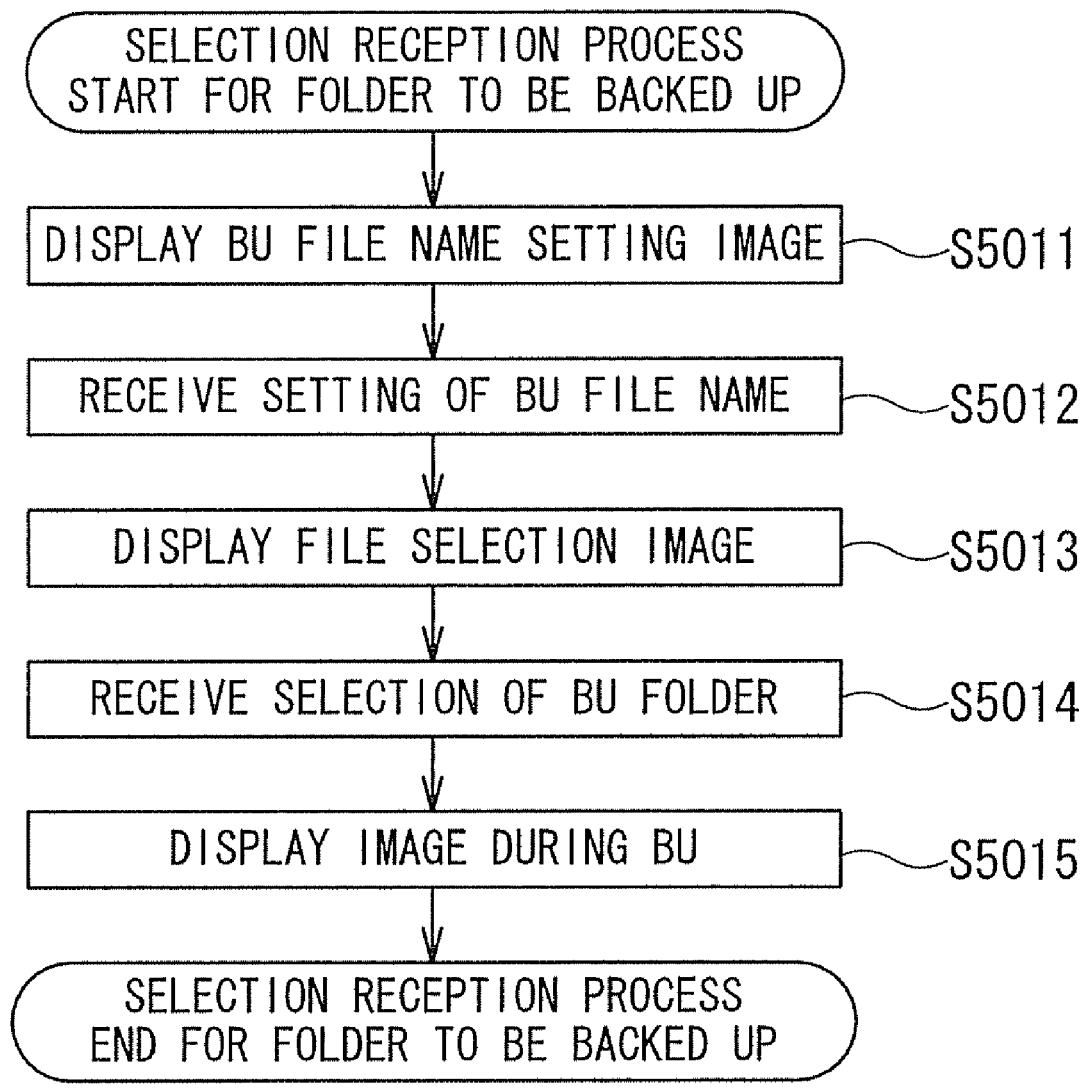
FIG. 13 is a subroutine flowchart showing a procedure of a selection reception process for a folder to be backed up that is executed by the backup processing unit in step S501 of FIG. 11.

FIG. 13 is a subroutine flowchart showing a procedure of the selection reception process for a folder to be backed up that is executed by the backup processing unit 21e in step S501 of FIG. 11. In FIG. 13, a code in which a numeral is added to S denotes each step of the flowchart.

Figure 14:
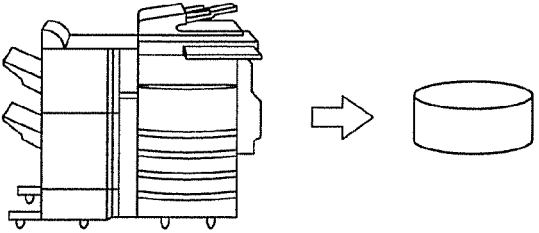
FIG. 14 is an illustrative view showing an example of various images to be displayed to a display input apparatus of an operation panel at the time of the selection reception process for a folder to be backed up.

FIG. 14 is an illustrative view showing an example of various images to be displayed to the display input apparatus of the operation panel 32 at the time of the selection reception process for a folder to be backed up.

First, in step S5011, the backup processing unit 21e displays an image for allowing the user to set a name of a backup copy FILEn to be currently backed up on the display input apparatus of the operation panel 32 (see the top of FIG. 14). Data backup is conventionally repeated at intervals according to need. For this reason, a plurality of backup copies are present in the backup copy storage unit 44 of the backup apparatus 40. A name of each backup copy FILEn is set to identify the backup copy.

Next, in step S5012, the backup processing unit 21e receives a file name input from the user through the display input apparatus of the operation panel 32.

Figures 15, 16:
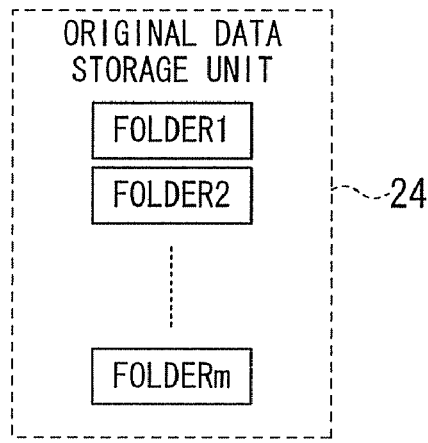
FIG. 15 is an illustrative view showing an example of a case where data stored in an original data storage unit is divided into folders.
FIG. 16 is an illustrative view showing an example of content of a backup copy to be currently backed up.

FIG. 15 is an illustrative view showing an example of a case where data stored in the original data storage unit 24 is divided into folders.

As shown in FIG. 15, data stored in the original data storage unit 24 is divided into folders. At the time of storage, each folder is already encrypted using the MFP-key KM (E<KM>[FOLDERk]). In the following description, an example in which backup is performed in a folder unit will be described.

FIG. 16 is an illustrative view showing an example of content of a backup copy FILEn to be currently backed up.

As shown in FIG. 16, the backup copy FILEn is actually a set of respectively encrypted folders (E<KM>[FOLDERk]). In the following description, E<KM>[FILEn] means that each folder configuring the backup copy FILEn is encrypted (E<KM>[FOLDERk]). Each folder can be constantly independently handled.

In step S5013, the backup processing unit 21e displays an image for allowing the user to select a folder to be backed up on the display input apparatus of the operation panel 32 (see the middle of FIG. 14).

Next, in step S5014, the backup processing unit 21e receives information of at least one folder selected by the user through the display input apparatus of the operation panel 32. At least one selected folder is included in the backup copy FILEn to be currently backed up.

Next, in step S5015, the backup processing unit 21e displays an image including information indicating that the backup process is in operation on the display input apparatus of the operation panel 32 (see the bottom of FIG. 14). This image can overlap with the image indicating that part of a function of the MFP 20 realized in the job execution unit 31 is restricted by the function restriction unit 21d.

According to the above-described procedure, the selection reception process for a folder to be backed up can be executed.

The content and name of a file FILEn to be currently backed up are set by the selection reception process of a folder to be backed up as shown in FIG. 13 (see t=t1B in FIGS. 11 and 12). It should be noted that each folder of the backup copy FILEn to be currently backed up is already encrypted by an MFP-key KM (E<KM>[FILEn]) (see FIG. 16).

Subsequently, in step S502 of FIG. 11, the backup processing unit 21e provides the backup apparatus 40 with an instruction to start the backup process (or a backup start instruction).

Next, in step S503, the backup apparatus 40 receives the backup start instruction.

Next, in step S504, the CPU 41 of the backup apparatus 40 sends a BU-key-seed SB to the MFP 20.

Next, in step S505, the backup processing unit 21e receives the BU-key-seed SB (see t=t2B in FIGS. 11 and 12).

Next, in step S506, the backup processing unit 21e inputs the received BU-key-seed SB to the key generation unit 25 to generate a BU-key KB and stores the BU-key KB in a required work area of the RAM 22 (see t=t3B in FIGS. 11 and 12).

Next, in step S507, the backup processing unit 21e causes the BU-key encryption and decryption unit 27 to encrypt a file FILEn to be currently backed up using the BU-key KB. As a result, the backup copy FILEn is double encrypted (see t=t4B in FIGS. 11 and 12).

Next, in step S508, the backup processing unit 21e sends the double-encrypted backup copy FILEn(E<KB>[E<KM>[FILEn]]) to the backup apparatus 40.

Next, in step S509, the backup apparatus 40 receives the double-encrypted backup copy FILEn(E<KB>[E<KM>[FILEn]]) (see t=t5B in FIGS. 11 and 12).

Next, in step S510, the CPU 41 of the backup apparatus 40 stores the double-encrypted backup copy FILEn(E<KB>[E<KM>[FILEn]]) in the backup copy storage unit 44.

Next, in step S511, the backup processing unit 21e causes the BU-key encryption and decryption unit 27 to encrypt an MFP-key-seed SM using the BU-key KB stored in the required work area of the RAM 22 and acquires E<KB>[SM] (see t=t6B in FIGS. 11 and 12). The MFP-key-seed SM is a copy of the MFP-key-seed SM stored in the NVRAM 28.

Next, in step S512, the backup processing unit 21e sends E<KB>[SM] to the backup apparatus 40.

Next, in step S513, the backup apparatus 40 receives E<KB>[SM] (see t=t7B in FIGS. 11 and 12).

Next, in step S514, the CPU 41 of the backup apparatus 40 stores E<KB>[SM] in the backup copy storage unit 44.

Next, in step S515, the CPU 41 of the backup apparatus 40 provides the MFP 20 with an instruction to end the backup process (or a backup end instruction).

Next, in step S516, the backup processing unit 21e receives the backup end instruction.

Next, in step S517, the backup processing unit 21e deletes the BU-key KB stored in the required work area of the RAM 22 (see t=t8B in FIGS. 11 and 12).

According to the above-described procedure, data of the MFP 20 can be backed up in the backup apparatus 40 while maintaining the backed-up data with high confidentiality.

(1-2-4) Restore Process

Subsequently, there will be described a procedure of the process of restoring a backup copy from the backup apparatus 40 to the MFP 20 while maintaining the backed-up data with high confidentiality.

Figure 17:
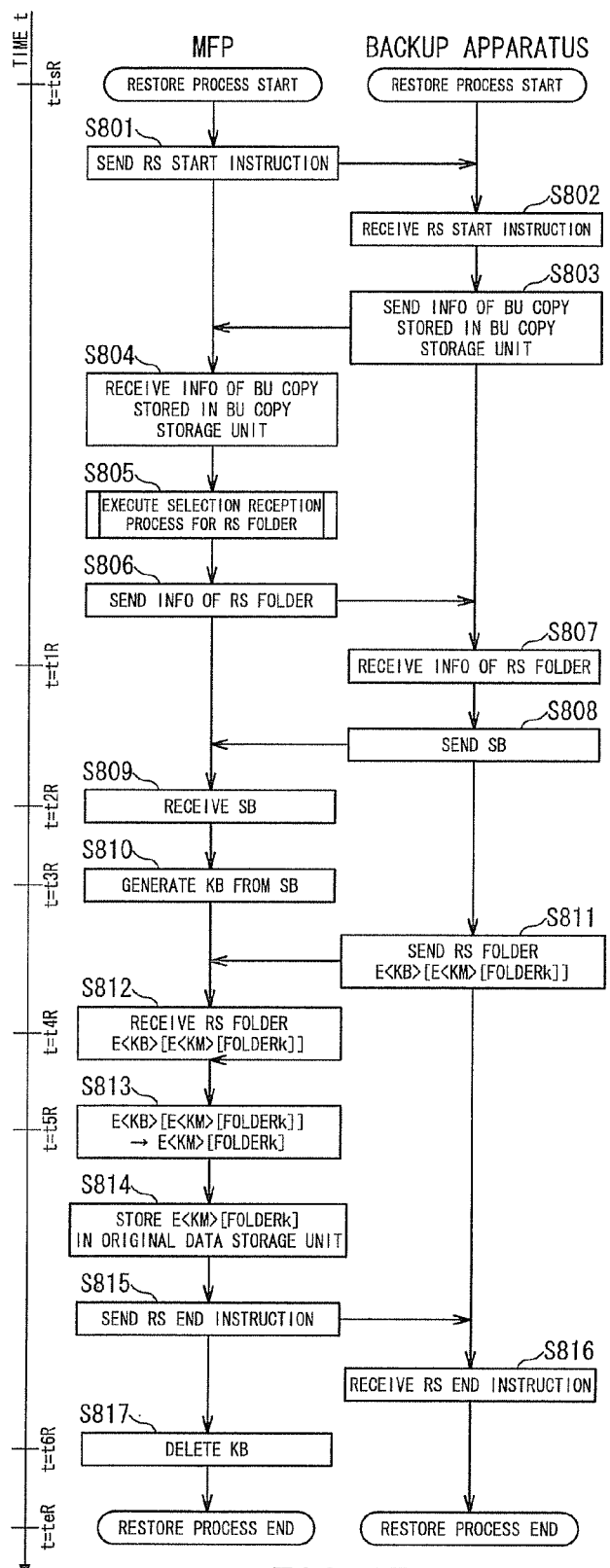
FIG. 17 is a subroutine flowchart showing a procedure of the restore process to be executed by a restore processing unit in step S8 of FIG. 6.

FIG. 17 is a subroutine flowchart showing a procedure of the restore process to be executed by the restore processing unit 21g in step S8 of FIG. 6. In FIG. 17, a code in which a numeral is added to S denotes each step of the flowchart. In this procedure, the CPU 41 of the backup apparatus 40 executes various processes according to restore program for the backup apparatus 40.

Figure 18:
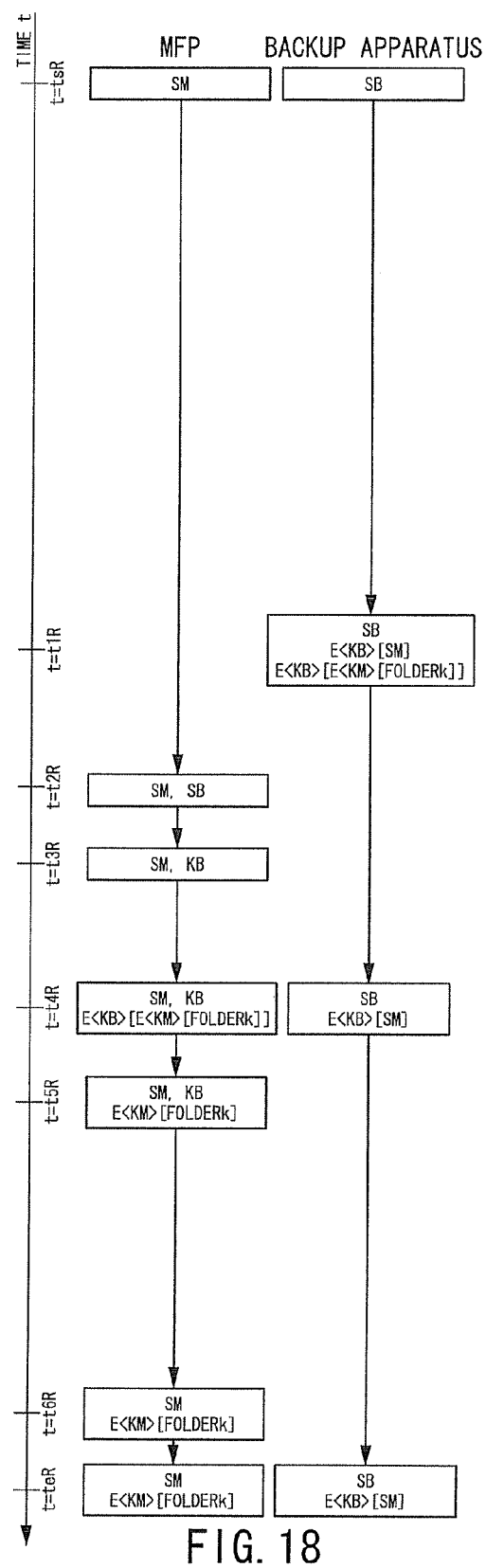
FIG. 18 is a state transition diagram briefly showing the transition of data to be retained by the MFP and the backup apparatus in the procedure of the restore process.

FIG. 18 is a state transition diagram briefly showing the transition of data to be retained by the MFP 20 and the backup apparatus 40 in the procedure of the restore process.

In FIGS. 17 and 18, the same time t is the same point of time.

As shown in FIG. 18, E<KB>[SM] is stored in the backup copy storage unit 44 at a start time (t=tsR) of the restore process.

First, in step S801, the restore processing unit 21g provides the backup apparatus 40 with an instruction to start the restore process (or a restore start instruction).

Next, in step S802, the backup apparatus 40 receives the restore start instruction.

Next, in step S803, the CPU 41 of the backup apparatus 40 provides the MFP 20 with information of a backup copy stored in the backup copy storage unit 44.

Next, in step S804, the restore processing unit 21g receives the information of the backup copy stored in the backup copy storage unit 44.

Next, in step S805, the restore processing unit 21g executes a process of receiving information of a folder to be restored by allowing the user to select the data to be currently restored from the backup copy stored in the backup copy storage unit 44 (or a selection reception process for a folder to be restored).

Figure 19:
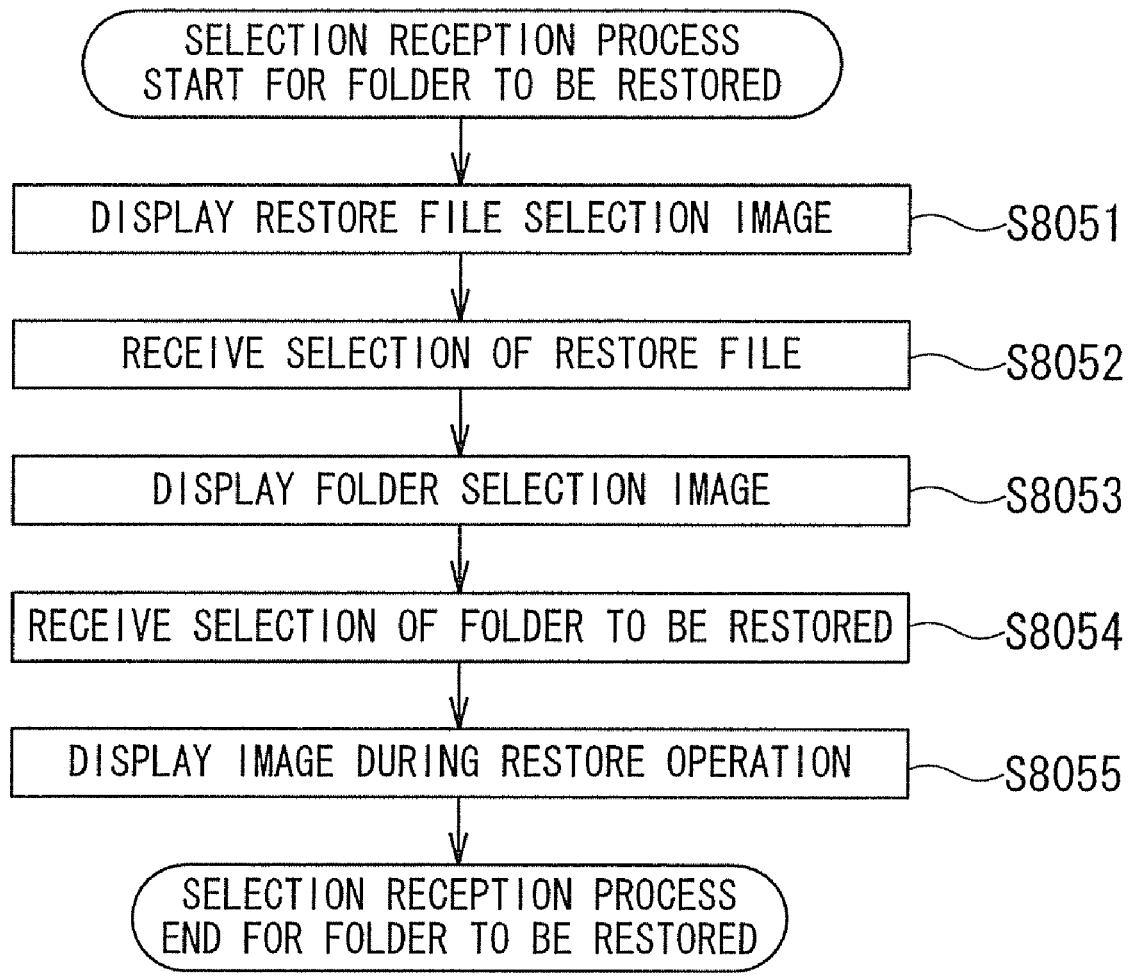
FIG. 19 is a subroutine flowchart showing a procedure of the selection reception process for a folder to be restored that is executed by the restore processing unit in step S805 of FIG. 17.

FIG. 19 is a subroutine flowchart showing a procedure of the selection reception process for a folder to be restored that is executed by the restore processing unit 21g in step S805 of FIG. 17. In FIG. 19, a code in which a numeral is added to S denotes each step of the flowchart.

FIG. 20 is an illustrative view showing an example of various images to be displayed to the display input apparatus of the operation panel 32 at the time of the selection reception process for a folder to be restored.

First, in step S8051, the restore processing unit 21g displays an image for allowing the user to select a name (or file name) of a backup copy including a folder to be currently restored on the display input apparatus of the operation panel 32 (see the top of FIG. 20).

Next, in step S8052, the restore processing unit 21g receives the selection of the backup copy input from the user through the display input apparatus of the operation panel 32.

Next, in step S8053, the restore processing unit 21g displays an image for allowing the user to select a folder to be restored on the display input apparatus of the operation panel 32 (see the middle of FIG. 20).

Next, in step S8054, the restore processing unit 21g receives the selection of at least one folder input from the user through the display input apparatus of the operation panel 32.

It does not matter if there are multiple folders to be restored. The restore process can be performed on a backup copy-by-backup copy basis. In the following description, there is shown an example in which the user selects FOLDERk.

Next, in step S8055, the restore processing unit 21g displays an image including information indicating that the restore process is in operation on the display input apparatus of the operation panel 32 (see the bottom of FIG. 20). This image can overlap with an image indicating that part of a function of the MFP 20 realized in the job execution unit 31 is restricted by the function restriction unit 21d.

According to the above-described procedure, the selection reception process for a folder to be restored can be executed.

In the selection reception process for a folder to be restored as shown in FIG. 19, a folder to be currently restored is set to a folder FOLDERk (see t=t1B in FIGS. 17 and 18). It should be noted that FOLDERk to be currently restored is already encrypted (E<KB>[E<KM>[FOLDERk]]).

Subsequently, in step S806 of FIG. 17, the restore processing unit 21g provides the backup apparatus 40 with information of the folder to be restored.

Next, in step S807, the backup apparatus 40 receives the information of the folder to be restored (see t=t1R in FIGS. 17 and 18).

Next, in step S808, the CPU 41 of the backup apparatus 40 sends a BU-key-seed SB to the MFP 20.

Next, in step S809, the restore processing unit 21g receives the BU-key-seed SB (see t=t2R in FIGS. 17 and 18).

Next, in step S810, the restore processing unit 21g inputs the received BU-key-seed SB to the key generation unit 25 to generate a BU-key KB and stores the BU-key KB in a required work area of the RAM 22 (see t=t3R in FIGS. 17 and 18).

Next, in step S811, the CPU 41 of the backup apparatus 40 sends the folder (V<KB>[E<KM>[FOLDERk]]) to be restored.

Next, in step S812, the restore processing unit 21g receives the folder (E<KB>[E<NM>[FOLDERk]]) to be restored (see t=t4R in FIGS. 17 and 18).

Next, in step S813, the restore processing unit 21g causes the BU-key encryption and decryption unit 27 to decrypt the folder (E<KB>[E<KM>[FOLDERk]]) to be restored using the BU-key KB stored in the required work area of the RAM 22 and acquires E<KM>[FOLDERk] (see t=t5R in FIGS. 17 and 18). As a result, an encryption state of the folder to be restored is a state in which encryption has been made only in an MFP-key KM as in data stored in the original data storage unit 24.

Next, in step S814, the restore processing unit 21g stores the folder (E<KB>[E<KM>[FOLDERk]]) to be restored in the original data storage unit 24.

Next, in step S815, the restore processing unit 21g provides the backup apparatus 40 with an instruction to end the restore process (or a restore end instruction).

Next, in step S816, the backup apparatus 40 receives the restore end instruction.

Next, in step S817, the restore processing unit 21g deletes the BU-key KB stored in the required work area of the RAM 22 (see t=t6R in FIGS. 17 and 18).

According to the above-described procedure, a backup copy can be restored from the backup apparatus 40 to the MFP 20 while maintaining backed-up data with high confidentiality.

(1-2-5) Backup Copy Edit Process

Subsequently, a procedure of a process of editing a backup copy stored in the backup copy storage unit 44 of the backup apparatus 40 with another equipment of a personal computer or the like (or the edition apparatus 60) will be described.

The backup copy should be returned to plaintext so as to edit the backup copy with the other equipment of the personal computer or the like.

Figure 21:
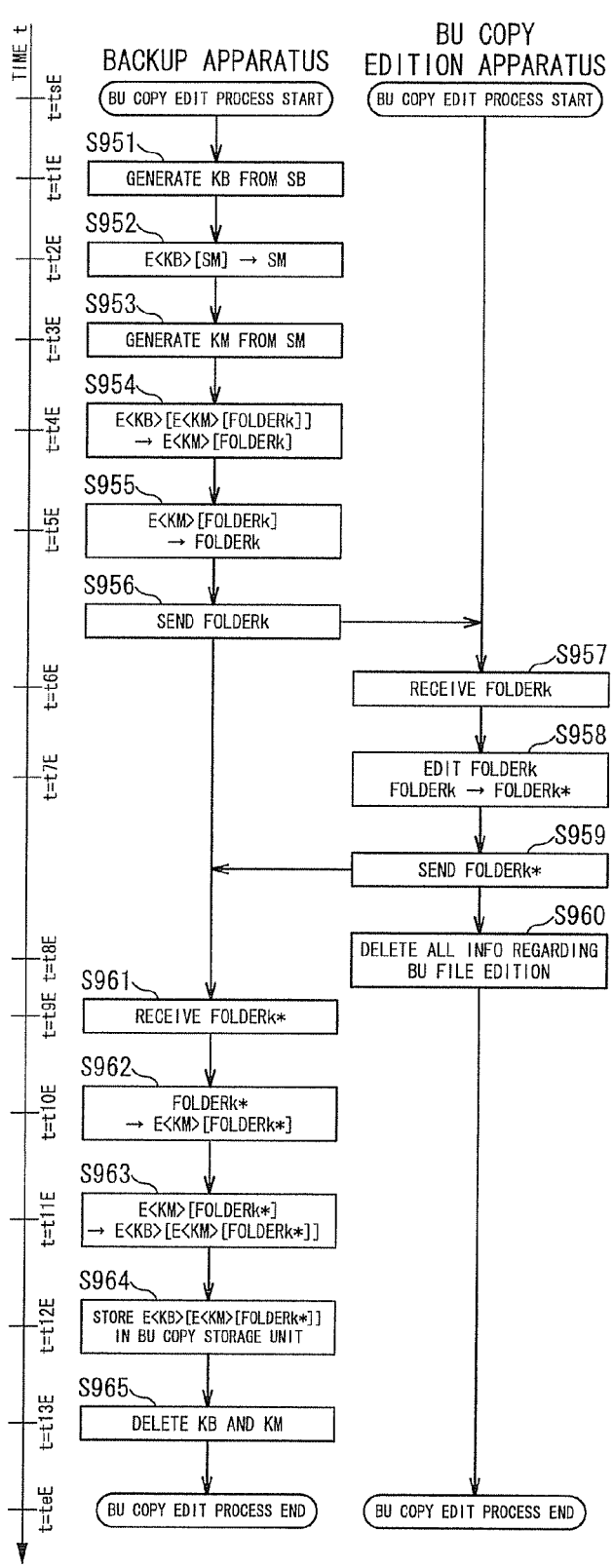
FIG. 21 is a flowchart showing a procedure of a process (or backup copy edit process) in which the edition apparatus edits a backup copy stored in a backup copy storage unit while maintaining backed-up data with high confidentiality.

FIG. 21 is a flowchart showing a procedure of a process (or backup copy edit process) in which the edition apparatus 60 edits a backup copy stored in the backup copy storage unit 44 while maintaining backed-up data with high confidentiality. In FIG. 21, a code in which a numeral is added to S denotes each step of the flowchart.

In the above-described procedure, the CPU 41 of the backup apparatus 40 executes various processes according to backup copy edit program for the backup apparatus 40. Moreover, the CPU 61 of the edition apparatus 60 executes various processes according to backup copy edit program for the edition apparatus 60.

Figure 22:
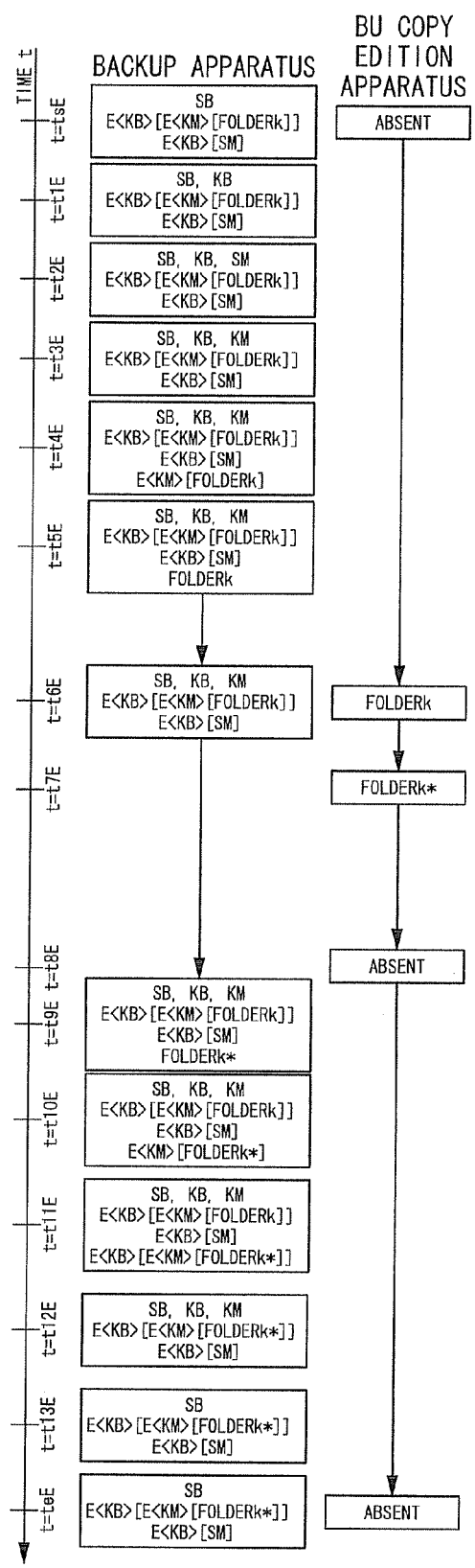
FIG. 22 is a state transition diagram briefly showing the transition of data to be retained by the backup apparatus and the edition apparatus in a procedure of the backup copy edit process.

FIG. 22 is a state transition diagram briefly showing the transition of data to be retained by the backup apparatus 40 and the edition apparatus 60 in the procedure of the backup copy edit process.

In FIGS. 21 and 22, the same time t is the same point of time.

The procedure of the backup copy edit process shown in FIG. 21 is started in the edition apparatus 60 when the backup copy edit program for the edition apparatus 60 is loaded from the ROM 63 to the RAM 62 to be started, the edition apparatus 60 is connected to the backup apparatus 40, authentication succeeds, and a folder to be edited is selected.

In addition, the CPU 61 of the edition apparatus 60 executes the authentication in the same procedure as shown in FIG. 9 and the selection of the folder to be edited in the same procedure as shown in FIG. 19 according to backup copy edit program for the edition apparatus 60. In the following description, an example in which FOLDERk is selected as the folder to be edited will be described.

As shown in FIG. 22, the folder to be edited is set (FOLDERk) at a start time (t=tsE) of the backup copy edit process. It should be noted that FOLDERk is already double-encrypted (E<KB>[E<KM>[FOLDERk]]).

In step S951, the CPU 41 of the backup apparatus 40 creates a copy of a BU-key-seed SB from the NVRAM 48, inputs the copy to the key generation unit 45, generates a BU-key KB, and stores the BU-key KB in a required work area of the RAM 42 (see t=t1E in FIGS. 21 and 22).

Next, in step S952, the CPU 41 of the backup apparatus 40 causes the BU-key encryption and decryption unit 47 to decrypt E<KB>[SM] stored in the backup copy storage unit 44 using the BU-key KB stored in the required work area of the RAM 42 and acquires an MFP-key-seed SM of plaintext (see t=t2E in FIGS. 21 and 22).

Next, in step S953, the CPU 41 of the backup apparatus 40 inputs the MFP-key-seed SM to the key generation unit 45, generates an MFP-key KM, and stores the MFP-key KM in a required work area of the RAM 42 (see t=t3E in FIGS. 21 and 22).

Next, in step S954, the CPU 41 of the backup apparatus 40 causes the BU-key encryption and decryption unit 47 to decrypt the folder (E<KB>[E<KM>[FOLDERk]]) to be edited using the BU-key KB stored in the required work area of the RAM 42 and acquires E<KM>[FOLDERk] (see t=t4E in FIGS. 21 and 22).

Next, in step S955, the CPU 41 of the backup apparatus 40 causes the MFP-key encryption and decryption unit 46 to decrypt E<KM>[FOLDERk] using the MFP-key KM stored in the required work area of the RAM 42 and acquires FOLDERk of plaintext (see t=t5E in FIGS. 21 and 22).

Next, in step S956, the CPU 41 of the backup apparatus 40 sends FOLDERk of the plaintext to the edition apparatus 60.

Next, in step S957, the CPU 61 of the edition apparatus 60 receives FOLDERk of the plaintext from the backup apparatus 40 and temporarily stores FOLDERk in the backup copy storage unit 64 for edition (see t=t6E in FIGS. 21 and 22).

Next, in step S958, the CPU 61 of the edition apparatus 60 creates an edited folder FOLDERk* by editing FOLDERk (see t=t7E in FIGS. 21 and 22).

Next, in step S959, the CPU 61 of the edition apparatus 60 sends the edited folder FOLDERk* to the backup apparatus 40.

Next, in step S960, the CPU 61 of the edition apparatus 60 deletes all information regarding the edited folder FOLDER from the edition apparatus 60 (including the RAM 62 and the backup copy storage unit 64 for edition) (see t=t8E in FIGS. 21 and 22).

Next, in step S961, the backup apparatus 40 receives the edited folder FOLDERk* of the edition apparatus 60 (see t=t9E in FIGS. 21 and 22).

Next, in step S962, the CPU 41 of the backup apparatus 40 causes the MFP-key encryption and decryption unit 46 to encrypt FOLDERk* using the MFP-key KM stored in the required work area of the RAM 42 and acquires E<KM>[FOLDERk*] (see t=t10E in FIGS. 21 and 22).

Next, in step S963, the CPU 41 of the backup apparatus 40 causes the BU-key encryption and decryption unit 47 to encrypt E<KM>[FOLDERk*] using the BU-key KB stored in the required work area of the RAM 42 and acquires E<KB>[E<KM>[FOLDERk*]] (see t=t11E in FIGS. 21 and 22).

Next, in step S964, the CPU 41 of the backup apparatus 40 stores the double-encrypted edited E<KB>[E<KM>[FOLDERk*]] in the backup copy storage unit 44. At t=t12E in FIG. 22, there is shown an example in which E<KB>[E<KM>[FOLDERk]] is overwritten by E<KB>[E<KM>[FOLDERk*]] (see t=t12E in FIGS. 21 and 22).

Next, in step S965, the CPU 41 of the backup apparatus 40 deletes the BU-key KB and the MFP-key KM stored in the required work areas of the RAM 42 (see t=t13E in FIGS. 21 and 22).

In the above-described procedure, the edition apparatus 60 can edit a backup copy stored in the backup copy storage unit 44 while maintaining backed-up data with high confidentiality.

The backup system 10 for the image forming apparatus according to this embodiment backs up a backup copy in the backup copy storage unit 44 of the backup apparatus 40 after double-encrypting the backup copy in the MFP 20, thereby providing the high confidentiality of the backed-up data (or backup copy).

Since the backup copy to be backed up is double encrypted, an MFP-key KM serving as a specific key of the MFP 20 is required when the backup copy is converted into plaintext for edition by another equipment. However, this MFP-key KM is sent to the backup apparatus 40 after the MFP-key-seed SM is encrypted with a BU-key KB serving as a specific key of the backup apparatus 40. For this reason, the MFP-key KM itself can be prevented from being leaked.

Moreover, the backup system 10 for the image forming apparatus according to this embodiment generates a key, if needed, by saving an MFP-key KM serving as a specific key of the MFP 20 and a BU-key KB serving as a specific key of the backup apparatus 40 in a state of seeds SM and SB. The generated key is stored in a volatile storage medium of an RAM or the like, and is deleted when each process is completed. Consequently, the key itself can be prevented from being leaked.

(2) Second Embodiment (2-1) Configuration

Since a backup system 10A for the image forming apparatus according to this embodiment has the same configuration as the backup system 10 shown in the first embodiment, a description is omitted.

(2-2) Operation

Next, an example of an operation of the backup system 10A for the image forming apparatus according to this embodiment will be described.

(2-2-1) Main Process

The backup system 10A for the image forming apparatus according to this embodiment has processes different from the main process of the backup system 10 shown in FIG. 6 and the backup process of step S5 and the restore process of step S8 shown in FIG. 6. Since the other procedures are not different, a description is omitted.

(2-2-2) Backup Process

Another procedure of the process of backing up data of the MFP 20 in the backup apparatus 40 while maintaining the backed-up data with high confidentiality will be described.

Figure 23:
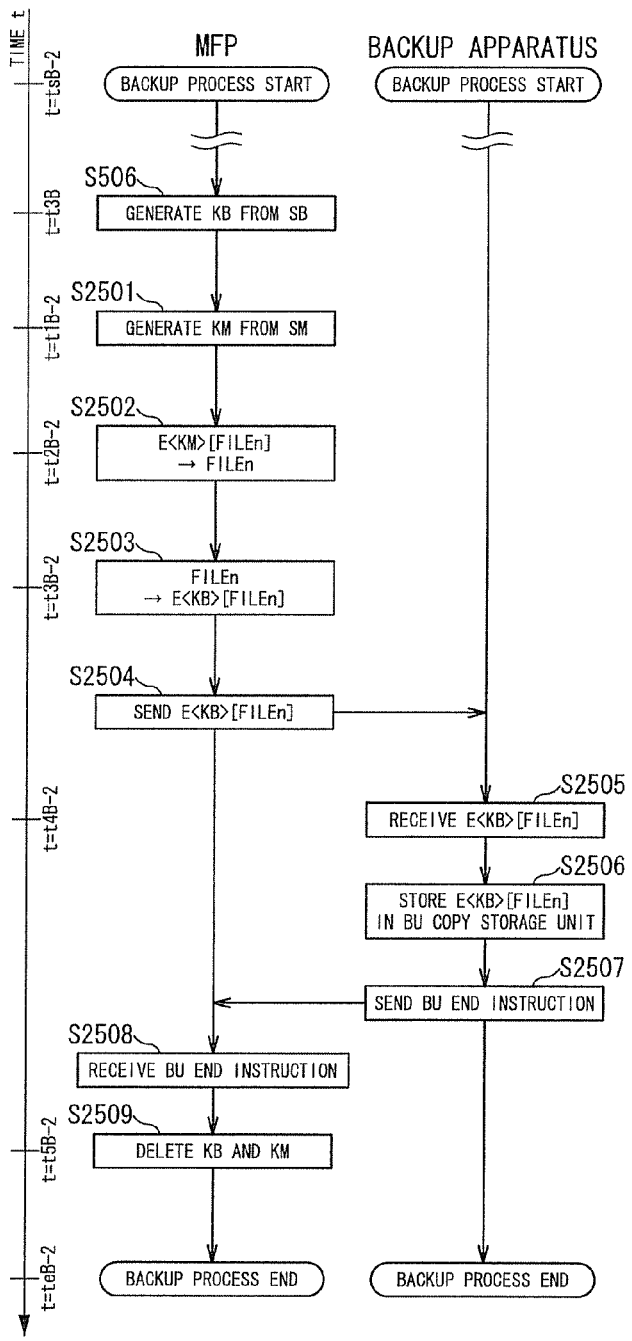
FIG. 23 is a subroutine flowchart showing another procedure of the backup process to be executed by a backup processing unit in step S5 of FIG. 6.

FIG. 23 is a subroutine flowchart showing another procedure of the backup process to be executed by the backup processing unit 21e in step S5 of FIG. 6. In this procedure, the CPU 41 of the backup apparatus 40 executes various processes according to backup program for the backup apparatus 40.

Figure 24:
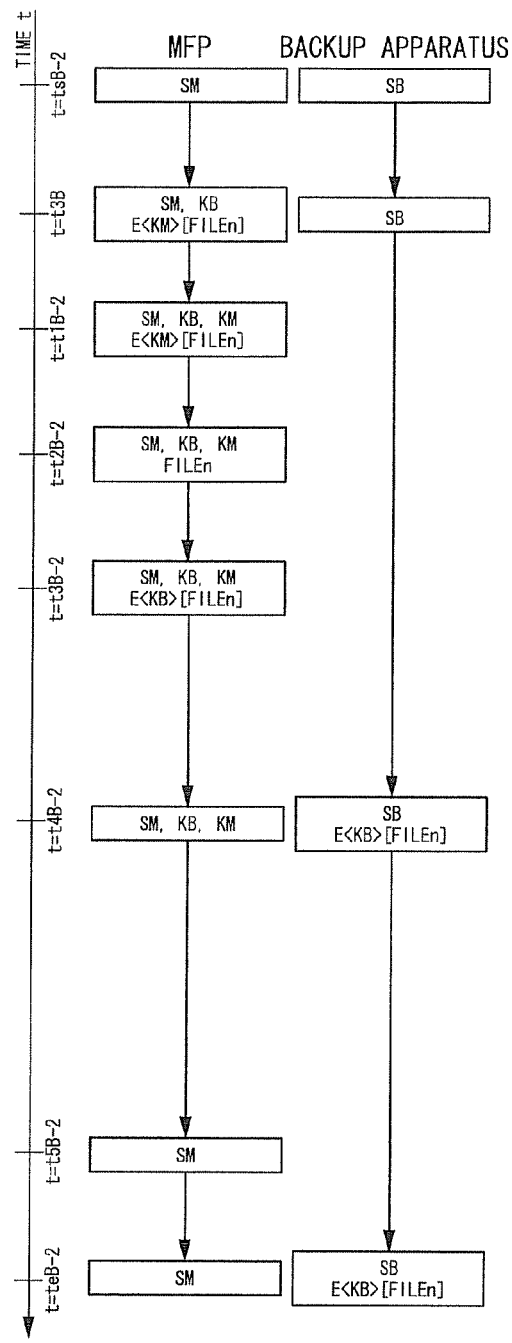
FIG. 24 is a state transition diagram briefly showing the transition of data to be retained by the MFP and the backup apparatus in the other procedure of the backup process.

FIG. 24 is a state transition diagram briefly showing the transition of data to be retained by the MFP 20 and the backup apparatus 40 in the other procedure of the backup process.

In FIGS. 23 and 24, the same time t is the same point of time.

When data retained by the MFP 20 and the backup apparatus 40 are compared at a start time (t=tsB-2) and an end time (t=teB-2) in the other procedure of the backup process of FIG. 24, it is obvious that a backup copy FILEn(E<KB>[FILEn]) encrypted only in the BU-key KB is given to the backup apparatus 40 in the other procedure of the backup process shown in FIG. 23.

First, the backup processing unit 21e of the MFP 20 and the CPU 41 of the backup apparatus 40 execute steps S501 to S505 shown in FIG. 11. In a result of this procedure, it should be noted that the content and name of a file FILEn to be backed up are set (E<KM>[FILEn]).

Next, in step S506 (see FIG. 11), the backup processing unit 21e inputs the received BU-key-seed SB to the key generation unit 25 to generate the BU-key KB and stores the BU-key KB in the required work area of the RAM 22 (see t=t3B in FIGS. 23 and 24 or FIGS. 11 and 12).

Next, in step S2501, the backup processing unit 21e creates a copy of an MFP-key-seed SM from the NVRAM 28, inputs the copy to the key generation unit 25, generates an MFP-key KM, and stores the MFP-key KM in a required work area of the RAM 22 (see t=t1B-2 in FIGS. 23 and 24).

Next, in step S2502, the backup processing unit 21e creates plaintext by causing the MFP-key encryption and decryption unit 26 to decrypt a file FILEn to be currently backed up using the MFP-key KM stored in the required work area of the RAM 22 (see t=t2B-2 in FIGS. 23 and 24).

Next, in step S2503, the backup processing unit 21e causes the BU-key encryption and decryption unit 27 to encrypt the file FILEn to be currently backed up using the BU-key KB stored in the required work area of the RAM 22 and acquires a backup copy FILEn(E<KB>[FILEn]) (see t=t3B-2 in FIGS. 23 and 24).

Next, in step S2504, the backup processing unit 21e sends the backup copy FILEn(E<KB>[FILEn]) to the backup apparatus 40.

Next, in step S2505, the backup apparatus 40 receives the backup copy FILEn(E<KB>[FILEn]) encrypted only in a specific key of the backup apparatus 40 (see t=t4B-2 in FIGS. 23 and 24).

Next, in step S2506, the CPU 41 of the backup apparatus 40 stores the backup copy FILEn(E<KB>[FILEn]) in the backup copy storage unit 44.

Next, in step S2507, the CPU 41 of the backup apparatus 40 provides the MFP 20 with an instruction to end the backup process (or a backup end instruction).

Next, in step S2508, the backup processing unit 21e receives the backup end instruction.

Next, in step S2509, the backup processing unit 21e deletes the BU-key KB and the MFP-key KM stored in the required work area of the RAM 22 (see t=t5B-2 in FIGS. 23 and 24).

According to the above-described procedure, data of the MFP 20 can be backed up in the backup apparatus 40 while maintaining the backed-up data with high confidentiality.

(2-2-3) Restore Process

Subsequently, there will be described another procedure of the process of restoring a backup copy from the backup apparatus 40 to the MFP 20 while maintaining the backed-up data with high confidentiality.

Figure 25:
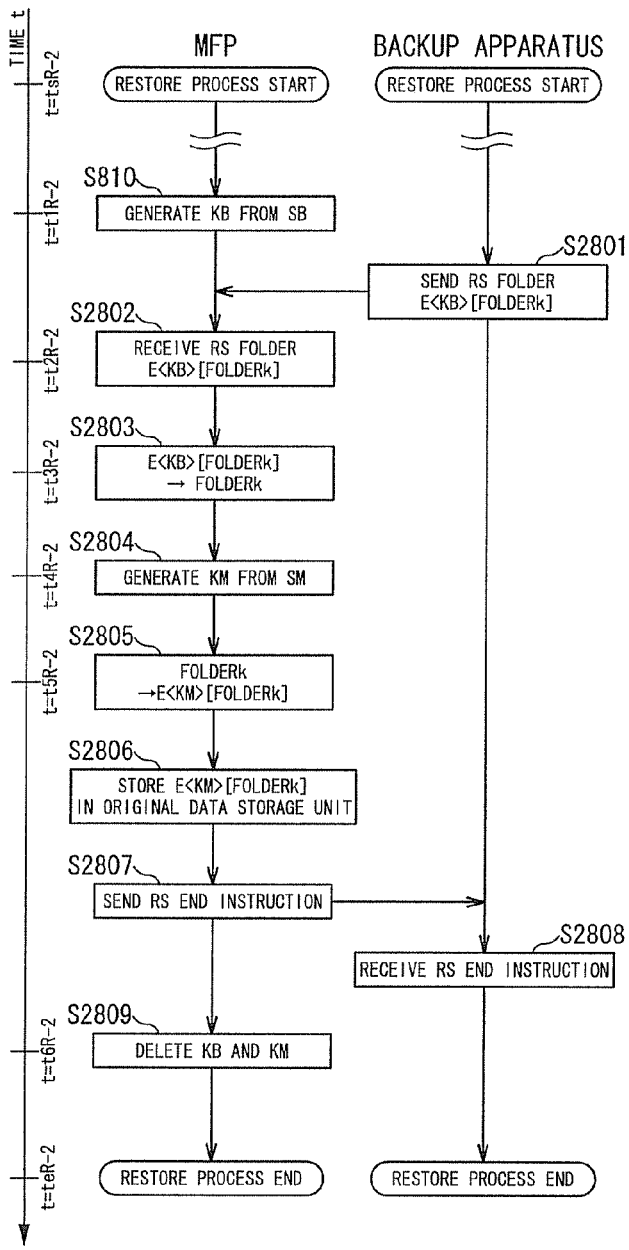
FIG. 25 is a subroutine flowchart showing another procedure of the restore process to be executed by a restore processing unit in step S8 of FIG. 6.

FIG. 25 is a subroutine flowchart showing another procedure of the restore process to be executed by the restore processing unit 21g in step S8 of FIG. 6. In FIG. 25, a code in which a numeral is added to S denotes each step of the flowchart. In this procedure, the CPU 41 of the backup apparatus 40 executes various processes according to restore program for the backup apparatus 40.

Figure 26:
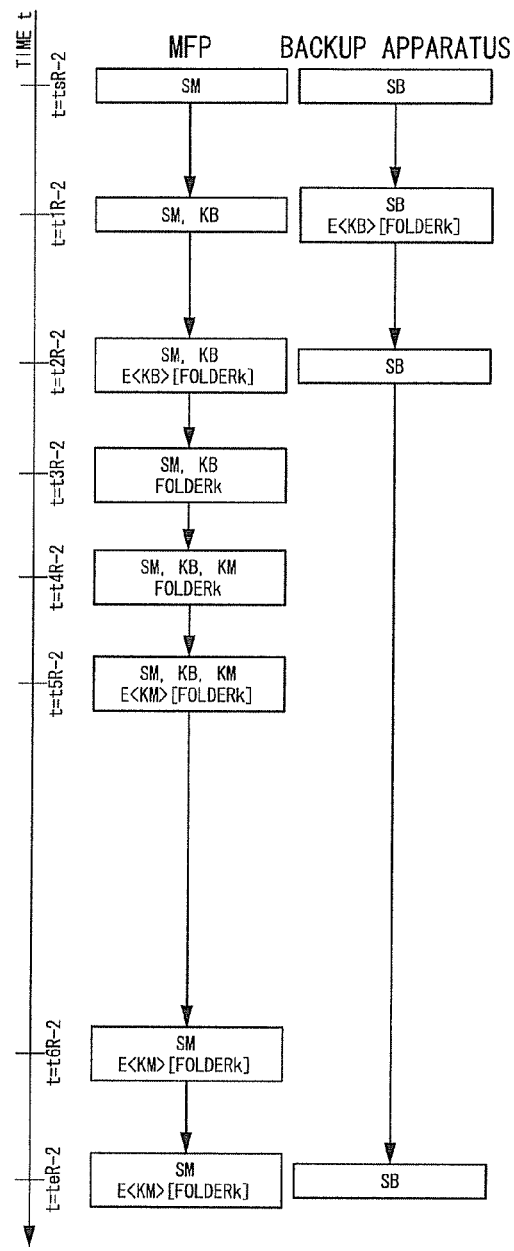
FIG. 26 is a state transition diagram briefly showing the transition of data to be retained by the MFP and the backup apparatus in the other procedure of the restore process.

FIG. 26 is a state transition diagram briefly showing the transition of data to be retained by the MFP 20 and the backup apparatus 40 in the other procedure of the restore process.

In FIGS. 25 and 26, the same time t is the same point of time.

As shown in FIG. 26, E<KB>[SM] is not stored in the backup copy storage unit 44 at a start time (t=tsR) of the other procedure of the restore process. In the other procedure of the backup process as shown in FIGS. 23 and 24, E<KB>[SM] is not sent. Moreover, it should be noted that FOLDERk is encrypted only in a BU-key KB serving as a specific key of the backup apparatus 40 (E<KB>[FOLDERk]).

First, the backup processing unit 21e of the MFP 20 and the CPU 41 of the backup apparatus 40 execute steps S801 to S809 shown in FIG. 17. In a result of this procedure, it should be noted that the folder FOLDERk to be currently restored is set (E<KB>[FOLDERk]).

Next, in step S810 (see FIG. 17), the restore processing unit 21g inputs the received BU-key-seed SB to the key generation unit 25 to generate a BU-key KB and stores the BU-key KB in a required work area of the RAM 22 (see t=t1R-2 in FIGS. 25 and 26).

Next, in step S2801, the CPU 41 of the backup apparatus 40 sends the folder (E<KB>[FOLDERk]) to be restored.

Next, in step S2802, the restore processing unit 21g receives the folder (E<KB>[FOLDERk]) to be restored (see t=t2R-2 in FIGS. 25 and 26).

Next, in step S2803, the restore processing unit 21g causes the BU-key encryption and decryption unit 27 to decrypt the folder (E<KB>[FOLDERk]) to be restored using the BU-key KB stored in the required work area of the RAM 22 and acquires the folder FOLDERk to be restored in the plaintext (see t=t3R-2 in FIGS. 25 and 26).

Next, in step S2804, the restore processing unit 21g creates a copy of an MFP-key-seed SM from the NVRAM 28, inputs the copy to the key generation unit 25, generates an MFP-key KM, and stores the MFP-key KM in a required work area of the RAM 22 (see t=t4R-2 in FIGS. 25 and 26).

Next, in step S2805, the restore processing unit 21g causes the MFP-key encryption and decryption unit 26 to encrypt a folder FOLDERk to be restored in plaintext using the MFP-key KM stored in the required work area of the RAM 22 and acquires E<KM>[FOLDERk]) (see t=t5R-2 in FIGS. 25 and 26). As a result, an encryption state of the folder to be restored is a state in which encryption has been made only in the MFP-key KM as in data stored in the original data storage unit 24.

Next, in step S2806, the restore processing unit 21g stores the folder (E<KM>[FOLDERk]) to be restored in the original data storage unit 24.

Next, in step S2807, the restore processing unit 21g provides the backup apparatus 40 with an instruction to end the restore process (or a restore end instruction).

Next, in step S2808, the backup apparatus 40 receives the restore end instruction.

Next, in step S2809, the restore processing unit 21g deletes the BU-key KB and the MFP-key KM stored in the required work area of the RAM 22 (see t=t6R-2 in FIGS. 25 and 26).

According to the above-described procedure, a backup copy can be restored from the backup apparatus 40 to the MFP 20 while maintaining backed-up data with high confidentiality.

(2-2-4) Backup Copy Edit Process

Subsequently, another procedure of the process of editing a backup copy stored in the backup copy storage unit 44 of the backup apparatus 40 with another equipment of a personal computer or the like (or the edition apparatus 60) will be described.

Figure 27:
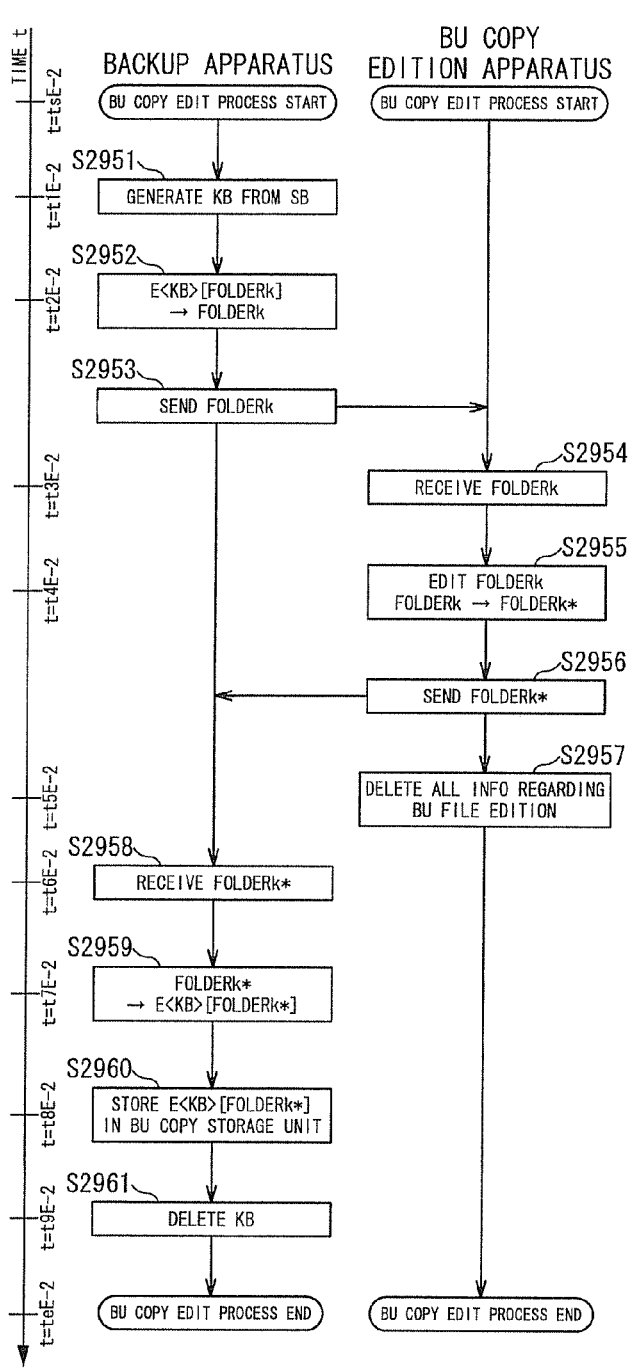
FIG. 27 is a flowchart showing another procedure of the process (or backup copy edit process) in which the edition apparatus edits a backup copy stored in the backup copy storage unit while maintaining backed-up data with high confidentiality.

FIG. 27 is a flowchart showing another procedure of the process (or backup copy edit process) in which the edition apparatus 60 edits a backup copy stored in the backup copy storage unit 44 while maintaining backed-up data with high confidentiality. In FIG. 27, a code in which a numeral is added to S denotes each step of the flowchart.

In the above-described procedure, the CPU 41 of the backup apparatus 40 executes various processes according to backup copy edit program for the backup apparatus 40. Moreover, the CPU 61 of the edition apparatus 60 executes various processes according to backup copy edit program for the edition apparatus 60.

Figure 28:
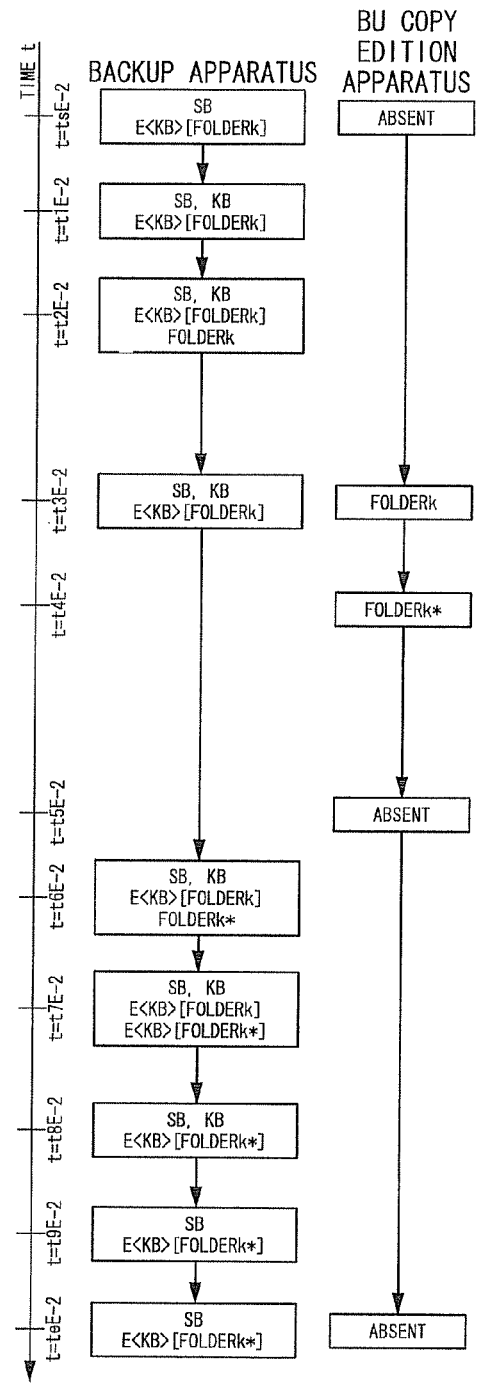
FIG. 28 is a state transition diagram briefly showing the transition of data to be retained by the backup apparatus and the edition apparatus in the other procedure of the backup copy edit process.

FIG. 28 is a state transition diagram briefly showing the transition of data to be retained by the backup apparatus 40 and the edition apparatus 60 in the other procedure of the backup copy edit process.

In FIGS. 27 and 28, the same time t is the same point of time.

Like the procedure shown in FIG. 21, the procedure of the backup copy edit process shown in FIG. 28 is started in the edition apparatus 60 when the backup copy edit program for the edition apparatus 60 is loaded from the ROM 63 to the RAM 62 to be started, the edition apparatus 60 is connected to the backup apparatus 40, authentication succeeds, and a folder to be edited is selected.

As shown in FIG. 28, the folder to be edited is set (FOLDERk) at a start time (t=tsE-2) of the backup copy edit process. It should be noted that FOLDERk is already encrypted only in the BU-key KB serving as the specific key of the backup apparatus 40 (E<KB>[FOLDERk]). As in the procedures shown in FIGS. 25 and 26, E<KB>[SM] is not stored in the backup copy storage unit 44.

In step S2951, the CPU 41 of the backup apparatus 40 creates a copy of a BU-key-seed SB from the NVRAM 48, inputs the copy to the key generation unit 45, generates a BU-key KB, and stores the BU-key KB in a required work area of the RAM 42 (see t=t1E-2 in FIGS. 27 and 28).

Next, in step S2952, the CPU 41 of the backup apparatus 40 causes the BU-key encryption and decryption unit 47 to decrypt a folder (E<KB>[FOLDERk]) to be edited using the BU-key KB stored in the required work area of the RAM 42 and acquires FOLDERk of plaintext (see t=t2E-2 in FIGS. 27 and 28).

Next, in step S2953, the CPU 41 of the backup apparatus 40 sends FOLDERk of the plaintext to the edition apparatus 60.

Next, in step S2954, the CPU 61 of the edition apparatus 60 receives FOLDERk of the plaintext from the backup apparatus 40 and temporarily stores FOLDERk in the backup copy storage unit 64 for edition (see t=t3E-2 in FIGS. 27 and 28).

Next, in step S2955, the CPU 61 of the edition apparatus 60 creates an edited folder FOLDERk* by editing FOLDERk (see t=t4E-2 in FIGS. 27 and 28).

Next, in step S2956, the CPU 61 of the edition apparatus 60 sends the edited folder FOLDERk* to the backup apparatus 40.

Next, in step S2957, the CPU 61 of the edition apparatus 60 deletes all information regarding the edited folder FOLDER from the edition apparatus 60 (including the RAM 62 and the backup copy storage unit 64 for edition) (see t=t5E-2 in FIGS. 27 and 28).

Next, in step S2958, the backup apparatus 40 receives the edited folder FOLDERk* of the edition apparatus 60 (see t=t6E-2 in FIGS. 27 and 28).

Next, in step S2959, the CPU 41 of the backup apparatus 40 causes the BU-key encryption and decryption unit 47 to encrypt FOLDERk* using the BU-key KB stored in the required work area of the RAM 42 and acquires E<KB>[FOLDERk*] (see t=7E-2 in FIGS. 27 and 28).

Next, in step S2960, the CPU 41 of the backup apparatus 40 stores the edited E<KB>[FOLDERk*] in the backup copy storage unit 44. At t=t8E-2 in FIG. 28, there is shown an example in which E<KB>[FOLDERk] is overwritten by E<KB>[FOLDERk*] (see t=t8E-2 in FIGS. 27 and 28).

Next, in step S2961, the CPU 41 of the backup apparatus 40 deletes the BU-key KB stored in the required work area of the RAM 42 (see t=t9E-2 in FIGS. 27 and 28).

In the above-described procedure, the edition apparatus 60 can edit a backup copy stored in the backup copy storage unit 44 while maintaining backed-up data with high confidentiality.

The backup system 10A for the image forming apparatus according to this embodiment backs up a backup copy in the backup copy storage unit 44 of the backup apparatus 40 after performing encryption only in a BU-key KB serving as a specific key of the backup apparatus 40. For this reason, the confidentiality of the backed-up data of system 10A is lower than that of the backup system 10 shown in the first embodiment.

However, in the backup system 10A according to this embodiment, a backup copy is encrypted only in a BU-key KB serving as a specific key of the backup apparatus 40. For this reason, the backup system 10A outperforms the backup system 10 shown in the first embodiment in the following two points.

First, an MFP-key KM serving as a specific key of the MFP 20 does not need to be extracted outside the MFP 20. The backup system 10A does not require the MFP-key KM serving as the specific key of the MFP 20 when a backup copy is converted into plaintext for edition by another equipment. Therefore, the backup system 10A is superior in confidentiality of the key since an MFP-key-seed SM as well as the MFP-key KM is not leaked in the backup process, the restore process, and the edit process.

Second, data of the MFP 20 backed up in the backup apparatus 40 can be restored in another MFP. In the restore process, the backup system 10A does not require a specific key of the MFP (or MFP 20) saving data serving as a source of a backup copy. For this reason, the data of the MFP 20 backed up in the backup apparatus 40 can be restored in the other MFP. For example, when the MFP 20 is defective or lost or the specific key of the MFP 20 is not obtainable, a backup copy can be easily restored in another MFP if the backup copy is backed up in the backup apparatus 40. Thus, the backup system 10A according to this embodiment is superior in convenience.

It is to be noted that the present invention is not limited to the above-described embodiments, and constituting elements can be modified and embodied without departing from the scope of the present invention in an implementing stage. Various inventions can be formed by an appropriate combination of a plurality of constituting elements described in the above-described embodiments. For example, some of the constituting elements described in the embodiments may be omitted. Furthermore, the constituting elements of different embodiments may be appropriately combined.

In this embodiment of the present invention, each step of the flowchart shows an example of a process sequentially executed in listed order. A process to be executed in parallel or individually can be included without sequential processing.

For example, a symmetric-key cryptosystem can be a stream cryptosystem configured by employing a block cryptosystem such as AES and DES in output feedback (OFB) or cipher feedback (CFB) of a cipher use mode. In the case of the stream cryptosystem, other processes can be applied sequentially from an encrypted part of data. In this case, for example, steps S507 and S508 of the procedure of FIG. 11 can be performed in parallel.

What is claimed is:

1. A backup system for an image forming apparatus comprising:
  the image forming apparatus including an original data storage unit configured to store data, the image forming apparatus sending a backup copy of the data; and a backup apparatus electrically communicating with the image forming apparatus, the backup apparatus including a backup copy storage unit configured to save the backup copy received from the image forming apparatus, wherein the image forming apparatus further includes:

a key generation unit configured to uniquely generate a key from an input key seed;

an encryption and decryption unit configured to execute an encryption process and a decryption process in a symmetric-key cryptosystem using the key generated from the key seed by the key generation unit; and a nonvolatile memory unit configured to pre-store a first key seed, and the backup apparatus further includes:

a nonvolatile memory unit configured to pre-store a second key seed, wherein the data stored in the original data storage unit is data encrypted in the cryptosystem using a first key generated from the first key seed by the key generation unit and stored in the original data storage unit, the key generation unit of the image forming apparatus generates a second key from a copy of the second key seed received from the backup apparatus, the encryption and decryption unit of the image forming apparatus performs double encryption by further encrypting the backup copy of at least a part of the data stored in the original data storage unit in the cryptosystem using the second key, and encrypts a copy of the first key seed in the cryptosystem using the second key, and the backup copy storage unit of the backup apparatus stores the double-encrypted backup copy received from the image forming apparatus and the copy of the first key seed encrypted in the cryptosystem using the second key.

2. A backup system for an image forming apparatus comprising:

the image forming apparatus including an original data storage unit configured to store data, the image forming apparatus sending a backup copy of the data; and a backup apparatus electrically communicating with the image forming apparatus, the backup apparatus including a backup copy storage unit configured to save the backup copy received from the image forming apparatus, wherein the image forming apparatus further includes:

a key generation unit configured to uniquely generate a key from an input key seed;

a nonvolatile memory unit configured to pre-store a first key seed;

a first encryption and decryption unit configured to execute an encryption process and a decryption process in a first symmetric-key cryptosystem using a first key generated from the first key seed by the key generation unit; and a second encryption and decryption unit configured to execute an encryption process and a decryption process in a second symmetric-key cryptosystem using a second key generated from a second key seed by the key generation unit, and the backup apparatus further includes:

a nonvolatile memory unit configured to pre-store the second key seed, wherein the data stored in the original data storage unit is data encrypted in the first cryptosystem using the first key and stored in the original data storage unit, the key generation unit of the image forming apparatus generates the second key from a copy of the second key seed received from the backup apparatus, the second encryption and decryption unit of the image forming apparatus performs double encryption by further encrypting the backup copy of at least a part of the data stored in the original data storage unit in the second cryptosystem using the second key, and encrypts a copy of the first key seed in the second cryptosystem using the second key, and the backup copy storage unit of the backup apparatus stores the double-encrypted backup copy received from the image forming apparatus and the copy of the first key seed encrypted in the second cryptosystem using the second key.

3. The backup system for the image forming apparatus according to claim 2, wherein the second encryption and decryption unit of the image forming apparatus decrypts the double-encrypted backup copy, stored in the backup copy storage unit and received from the backup apparatus, in the second cryptosystem using the second key, the backup copy received from the backup apparatus decrypted in the second cryptosystem using the second key being restored in the original data storage unit.

4. The backup system for the image forming apparatus according to claim 2, further comprising:

a backup copy edition apparatus, electrically communicating with the backup apparatus, configured to edit the backup copy stored in the backup copy storage unit of the backup apparatus, wherein the backup apparatus further includes:

the key generation unit;

the first encryption and decryption unit; and the second encryption and decryption unit, the key generation unit of the backup apparatus generates the second key from a copy of the second key seed stored in the nonvolatile storage unit of the backup apparatus, the second encryption and decryption unit of the backup apparatus creates plaintext by decrypting the copy of the first key seed, encrypted in the second cryptosystem using the second key stored in the backup copy storage unit, in the second cryptosystem using the second key, and decrypts the double-encrypted backup copy stored in the backup copy storage unit in the second cryptosystem using the second key, the key generation unit of the backup apparatus generates the first key from the copy of the first key seed converted into the plaintext, the first encryption and decryption unit of the backup apparatus creates plaintext by further decrypting the double-encrypted backup copy, decrypted in the second cryptosystem using the second key, in the first cryptosystem using the first key, the backup copy edition apparatus edits the backup copy of the plaintext received from the backup apparatus, the first encryption and decryption unit of the backup apparatus encrypts the edited backup copy received from the backup copy edition apparatus in the first cryptosystem using the first key, the second encryption and decryption unit of the backup apparatus performs double encryption by further encrypting the edited backup copy, encrypted in the first cryptosystem using the first key, in the second cryptosystem using the second key, and the backup copy storage unit further stores the edited and double-encrypted backup copy.

5. The backup system for the image forming apparatus according to claim 3, wherein the image forming apparatus further includes:
- an authentication processing unit configured to display information indicating that the backup apparatus is connected on a display apparatus when the backup apparatus is connected to the image forming apparatus such that electrical communication is enabled; and
- a display control unit configured to receive information indicating that the backup apparatus is connected from the authentication processing unit and display a backup or restore check image on the display apparatus for receiving a user's selection as to whether to execute either a process of backing up the data of the image forming apparatus in the backup apparatus or a process of restoring the backup copy from the backup apparatus to the image forming apparatus.

6. The backup system for the image forming apparatus according to claim 5, wherein the image forming apparatus further includes a function restriction unit configured to restrict a function requiring a write operation to the original data storage unit when receiving the user's selection through the backup or restore check image.

7. The backup system for the image forming apparatus according to claim 2, wherein the first and second symmetric-key cryptosystems are a stream cryptosystem using a block cryptosystem.

8. A backup system for an image forming apparatus comprising:
- the image forming apparatus including an original data storage unit configured to store data, the image forming apparatus sending a backup copy of the data; and
- a backup apparatus electrically communicating with the image forming apparatus, the backup apparatus including a backup copy storage unit configured to save the backup copy received from the image forming apparatus,
- wherein the image forming apparatus further includes:
- a key generation unit configured to uniquely generate a key from an input key seed;
- a nonvolatile memory unit configured to pre-store a first key seed;
- a first encryption and decryption unit configured to execute an encryption process and a decryption process in a first symmetric-key cryptosystem using a first key generated from the first key seed by the key generation unit; and
- a second encryption and decryption unit configured to execute an encryption process and a decryption process in a second symmetric-key cryptosystem using a second key generated from a second key seed by the key generation unit, and
- the backup apparatus further includes:
- a nonvolatile memory unit configured to pre-store the second key seed,
- wherein the data stored in the original data storage unit is data encrypted in the first cryptosystem using the first key and stored in the original data storage unit,
- the key generation unit of the image forming apparatus generates the first key from a copy of the first key seed stored in the nonvolatile memory unit of the image forming apparatus and generates the second key from a copy of the second key seed received from the backup apparatus,
- the first encryption and decryption unit of the image forming apparatus creates plaintext by decrypting the backup copy of at least a part of the data stored in the original data storage unit in the first cryptosystem using the first key,
- the second encryption and decryption unit of the image forming apparatus encrypts the backup copy converted into the plaintext in the second cryptosystem using the second key, and
- the backup copy storage unit of the backup apparatus stores the backup copy encrypted in the second cryptosystem using the second key received from the image forming apparatus.

9. The backup system for the image forming apparatus according to claim 8, wherein the second encryption and decryption unit of the image forming apparatus creates the plaintext by decrypting the backup copy, encrypted in the second cryptosystem using the second key and received from the backup apparatus, in the second cryptosystem using the second key, and
- the first encryption and decryption unit of the image forming apparatus encrypts the backup copy converted into the plaintext in the first cryptosystem using the first key,
- the backup copy encrypted in the first cryptosystem using the first key being restored in the original data storage unit.

10. The backup system for the image forming apparatus according to claim 9, further comprising:
- another image forming apparatus electrically communicating with the backup apparatus and including another original data storage unit configured to save the backup copy received from the backup apparatus,
- wherein the other image forming apparatus further includes:
- the key generation unit;
- a nonvolatile memory unit configured to pre-store a third key seed;
- the second encryption and decryption unit; and
- a third encryption and decryption unit configured to execute an encryption process and a decryption process in a third symmetric-key cryptosystem using a third key generated from the third key seed by the key generation unit,
- wherein the key generation unit of the other image forming apparatus generates the second key from a copy of the second key seed received from the backup apparatus,
- the second encryption and decryption unit of the other image forming apparatus creates the plaintext by decrypting the backup copy, encrypted in the second cryptosystem using the second key and received from the backup apparatus, in the second cryptosystem using the second key, and
- the third encryption and decryption unit of the other image forming apparatus encrypts the backup copy converted into the plaintext in the third cryptosystem using the third key,
- the backup copy encrypted in the third cryptosystem using the third key being restored in the other original data storage unit.

11. The backup system for the image forming apparatus according to claim 8, further comprising:
- a backup copy edition apparatus, electrically communicating with the backup apparatus, configured to edit the backup copy stored in the backup copy storage unit of the backup apparatus,
- wherein the backup apparatus further includes:
- the key generation unit; and
- the second encryption and decryption unit, the key generation unit of the backup apparatus generates the second key from a copy of the second key seed stored in the nonvolatile memory unit of the backup apparatus, the second encryption and decryption unit of the backup apparatus creates the plaintext by decrypting the backup copy, encrypted in the second cryptosystem using the second key and stored in the backup copy storage unit, in the second cryptosystem using the second key, the backup copy edition apparatus edits the backup copy of the plaintext received from the backup apparatus, the second encryption and decryption unit of the backup apparatus encrypts the edited backup copy received from the backup copy edition apparatus in the second cryptosystem using the second key, and the backup copy storage unit further stores the edited backup copy encrypted in the second cryptosystem using the second key.

12. The backup system for the image forming apparatus according to claim 9, wherein the image forming apparatus further includes:
an authentication processing unit configured to display information indicating that the backup apparatus is connected on a display apparatus when the backup apparatus is connected to the image forming apparatus such that electrical communication is enabled; and
a display control unit configured to receive information indicating that the backup apparatus is connected from the authentication processing unit and display a backup or restore check image on the display apparatus for receiving a user's selection as to whether to execute either a process of backing up the data of the image forming apparatus in the backup apparatus or a process of restoring the backup copy from the backup apparatus to the image forming apparatus.

13. The backup system for the image forming apparatus according to claim 12, wherein the image forming apparatus further includes a function restriction unit configured to restrict a function requiring a write operation to the original data storage unit when receiving the user's selection through the backup or restore check image.

14. The backup system for the image forming apparatus according to claim 8, wherein the first and second symmetric-key cryptosystems are a stream cryptosystem using a block cryptosystem.

15. A backup method for an image forming apparatus of backing up data stored in an original data storage unit of the image forming apparatus in a backup copy storage unit of a backup apparatus, comprising:
encrypting, by the image forming apparatus, the data in a first cryptosystem using a first key and storing the encrypted data in the original data storage unit;
receiving, by the image forming apparatus, a copy of a second key seed from the backup apparatus;
generating, by the image forming apparatus, a second key from the received copy of the second key seed;
performing, by the image forming apparatus, double encryption by further encrypting a backup copy of at least a part of the data stored in the original data storage unit in a second cryptosystem using the second key;
encrypting, by the image forming apparatus, a copy of the first key seed in the second cryptosystem using the second key;
receiving, by the backup apparatus, the double-encrypted backup copy and the copy of the first key seed encrypted in the second cryptosystem using the second key from the image forming apparatus; and storing, by the backup copy storage unit of the backup apparatus, the double-encrypted backup copy received from the image forming apparatus and the copy of the first key seed encrypted in the second cryptosystem using the second key.

16. The backup method for the image forming apparatus according to claim 15, further comprising:
receiving, by the image forming apparatus, the copy of the second key seed and the double-encrypted backup copy stored in the backup copy storage unit from the backup apparatus;
generating, by the image forming apparatus, the second key from the received copy of the second key seed;
decrypting, by the image forming apparatus, the received double-encrypted backup copy in the second cryptosystem using the second key; and
restoring, by the image forming apparatus, the backup copy, received from the backup apparatus, decrypted in the second cryptosystem using the second key in the original data storage unit.

17. The backup method for the image forming apparatus according to claim 15, further comprising:
generating, by the backup apparatus, the second key from the copy of the second key seed;
creating, by the backup apparatus, plaintext by decrypting the backup copy, encrypted in the second cryptosystem using the second key stored in the backup copy storage unit, in the second cryptosystem using the second key;
decrypting, by the backup apparatus, the double-encrypted backup copy stored in the backup copy storage unit in the second cryptosystem using the second key;
generating, by the backup apparatus, the first key from the copy of the first key seed converted into the plaintext;
creating, by the backup apparatus, plaintext by further decrypting the double-encrypted backup copy, decrypted in the second cryptosystem using the second key, in the first cryptosystem using the first key;
receiving, by a backup copy edition apparatus configured to edit the backup copy, the backup copy of the plaintext from the backup apparatus;
editing, by the backup copy edition apparatus, the backup copy of the plaintext;
receiving, by the backup apparatus, the edited backup copy from the backup copy edition apparatus;
encrypting, by the backup apparatus, the edited backup copy in the first cryptosystem using the first key;
performing, by the backup apparatus, double encryption by further encrypting the edited backup copy, encrypted in the first cryptosystem using the first key, in the second cryptosystem using the second key, and
further storing, by the backup copy storage unit of the backup apparatus, the edited and double-encrypted backup copy.

18. The backup method for the image forming apparatus according to claim 16, further comprising:
displaying, by the image forming apparatus, information indicating that the backup apparatus is connected on a display apparatus when the backup apparatus is connected to the image forming apparatus such that electrical communication is enabled; and
receiving information indicating that the backup apparatus is connected from an authentication processing unit and displaying a backup or restore check image on the display apparatus for receiving a user's selection as to whether to execute either a process of backing up the data of the image forming apparatus in the backup apparatus or a process of restoring the backup copy from the backup apparatus to the image forming apparatus.

19. The backup method for the image forming apparatus according to claim 18, further comprising:
restricting a function requiring a write operation to the original data storage unit when receiving the user's selection through the backup or restore check image.

20. The backup method for the image forming apparatus according to claim 15, wherein the first and second cryptosystems are a stream cryptosystem using a block cryptosystem.

* * * * *